(12) United States Patent
Wang et al.

(10) Patent No.: US 10,979,960 B2
(45) Date of Patent: Apr. 13, 2021

(54) COMMUNICATION METHOD, NETWORK DEVICE, AND TERMINAL DEVICE SUPPORTING MULTIMODE COMMUNICATION LINKS

(71) Applicant: HUAWEI TECHNOLOGIES CO., LTD., Guangdong (CN)

(72) Inventors: Hong Wang, Beijing (CN); Wei Quan, Beijing (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 16 days.

(21) Appl. No.: 16/245,029

(22) Filed: Jan. 10, 2019

(65) Prior Publication Data
US 2019/0150057 A1  May 16, 2019

Related U.S. Application Data

(63) Continuation of application No. PCT/CN2016/089912, filed on Jul. 13, 2016.

(51) Int. Cl.
*G08C 17/00* (2006.01)
*H04W 40/10* (2009.01)
(Continued)

(52) U.S. Cl.
CPC ....... *H04W 40/10* (2013.01); *H04W 36/0069* (2018.08); *H04W 36/16* (2013.01);
(Continued)

(58) Field of Classification Search
CPC ..... H04W 40/10; H04W 76/14; H04W 36/16; H04W 36/30; H04W 36/38; H04W 84/18
See application file for complete search history.

(56) References Cited

U.S. PATENT DOCUMENTS

| 2007/0201392 A1 | 8/2007 | Ramachandran |
| 2011/0103240 A1 | 5/2011 | Taghavi Nasrabadi et al. |

(Continued)

FOREIGN PATENT DOCUMENTS

| CN | 102550117 A | 7/2012 |
| CN | 102598844 A | 7/2012 |

(Continued)

OTHER PUBLICATIONS

RP-160677 Qualcomm Incorporated et al.,"New SI: Further Enhancements LTE Device to Device, UE to Network Relays for Wearables",3GPP TSG RAN Meeting #71,Gothenburg, Sweden, Mar. 7-10, 2016,total 7 pages.

*Primary Examiner* — Abdelnabi O Musa
(74) *Attorney, Agent, or Firm* — Womble Bond Dickinson (US) LLP

(57) ABSTRACT

A network device communicates with a first terminal device by using a first communication link, the first terminal device communicates with at least one second terminal device by using at least one second communication link the network device receives a measurement report sent by the first terminal device, where the measurement report includes at least one piece of measurement data; and sends to the first terminal device, indication information of a communication link change policy determined based on the at least one piece of measurement data, where the indication information is used to instruct the first terminal device to perform change processing on a communication link based on the communication link change policy, where the communication link includes at least one of the first communication link or the second communication link.

18 Claims, 8 Drawing Sheets

(51) Int. Cl.
   *H04W 36/16*   (2009.01)
   *H04W 76/14*   (2018.01)
   *H04W 36/00*   (2009.01)
   *H04W 36/30*   (2009.01)
   *H04W 36/38*   (2009.01)
   *H04W 52/02*   (2009.01)
   *H04W 84/18*   (2009.01)

(52) U.S. Cl.
   CPC ........... *H04W 36/30* (2013.01); *H04W 36/38* (2013.01); *H04W 52/0261* (2013.01); *H04W 76/14* (2018.02); *H04W 84/18* (2013.01); *Y02D 30/70* (2020.08)

(56) References Cited

U.S. PATENT DOCUMENTS

| | | | |
|---|---|---|---|
| 2012/0044836 A1* | 2/2012 | Sivavakeesar | H04W 24/02 370/255 |
| 2012/0184306 A1 | 7/2012 | Zou et al. | |
| 2014/0078952 A1 | 3/2014 | Bontu et al. | |
| 2014/0153390 A1 | 6/2014 | Ishii et al. | |
| 2016/0037322 A1* | 2/2016 | Nguyen | H04W 8/005 370/329 |
| 2016/0174278 A1 | 6/2016 | Gao et al. | |
| 2016/0198518 A1* | 7/2016 | Baek | H04W 24/10 370/329 |
| 2017/0006117 A1* | 1/2017 | Kafle | H04B 17/318 |
| 2017/0086252 A1 | 3/2017 | Chai et al. | |
| 2017/0251507 A1* | 8/2017 | Fodor | H04W 24/10 |

FOREIGN PATENT DOCUMENTS

| | | |
|---|---|---|
| CN | 102983944 A | 3/2013 |
| CN | 103037450 A | 4/2013 |
| CN | 103460780 A | 12/2013 |
| CN | 103718514 A | 4/2014 |
| EP | 2763494 A1 | 8/2014 |
| WO | 2015004142 A1 | 1/2015 |
| WO | 2015119538 A1 | 8/2015 |
| WO | 2015169380 A1 | 11/2015 |

* cited by examiner

COMMUNICATION METHOD, NETWORK DEVICE, AND TERMINAL DEVICE SUPPORTING MULTIMODE COMMUNICATION LINKS

CROSS-REFERENCE TO RELATED APPLICATIONS

This application is a continuation of International Application No. PCT/CN2016/089912, filed on Jul. 13, 2016. The aforementioned patent application is hereby incorporated by reference in its entirety.

TECHNICAL FIELD

The present invention relates to the communications field, and more specifically, to a communication method, a network device, and a terminal device.

BACKGROUND

In a current cellular communications technology, a terminal device communicates with a base station over an air interface (for example, a Uu interface). By using the base station, user data is forwarded to a destination node in a network or data from a network is forwarded to the terminal device. A device-to-device (D2D) communications technology is a technology for communication between terminals. Different from the existing cellular communications technology, in the D2D communications technology, data from terminal device does not need to be transmitted by using a base station, but is directly transmitted over an air interface (for example, a PC5 interface) between terminals. This reduces dependence of communication between terminal devices on a network and reduces a forwarding latency and network load to some extent, and therefore the D2D communications technology is widely applied.

Regardless of which of the foregoing communications technologies is used by a terminal device to perform communication, the terminal device encounters the following scenario: When the terminal device has little electricity remained or the terminal device has a relatively weak electric energy capability, if the terminal device performs communication at relatively high power, electricity (or electric energy) may be rapidly consumed and communication is interrupted. Therefore, in the foregoing scenario, how to reduce power consumption of the terminal device to save electricity (or electric energy) of the terminal device becomes a problem that has to be addressed.

SUMMARY

This application provides a communication method, a network device, and a terminal device, which can reduce terminal device power consumption.

According to a first aspect, this application provides a communication method, applied to a communications system including a network device, a first terminal device, and at least one second terminal device, where the network device communicates with the first terminal device by using a first communication link, the first terminal device communicates with the at least one second terminal device by using at least one second communication link, and the at least one second terminal device is in a one-to-one correspondence with the at least one second communication link, and the method includes: receiving, by the network device, a measurement report sent by the first terminal device, where the measurement report includes at least one piece of measurement data; and sending, by the network device to the first terminal device, indication information of a communication link change policy determined based on the at least one piece of measurement data, where the indication information is used to instruct the first terminal device to perform change processing on a communication link based on the communication link change policy, where the communication link includes the first communication link and/or the second communication link.

In one embodiment, before the receiving, by the network device, a measurement report sent by the first terminal device, the method further includes: sending, by the network device, first measurement configuration information to the first terminal device, where the first measurement configuration information includes a device-to-device D2D carrier frequency used by the at least one second communication link, and the D2D carrier frequency includes at least one of a carrier frequency for D2D communication based on a Long Term Evolution LTE system, a carrier frequency for D2D communication based on a wireless local area network WLAN, and a carrier frequency for D2D communication based on Bluetooth.

In one embodiment, before the receiving, by the network device, a measurement report sent by the first terminal device, the method further includes: sending, by the network device, second measurement configuration information to the first terminal device, where the second measurement configuration information includes a reporting condition of the measurement report, and the reporting condition includes at least one of a second communication link whose signal quality is higher than a first preset threshold exists in the at least one second communication link; a second communication link whose signal quality is higher than signal quality of the first communication link exists in the at least one second communication link; reporting is performed based on a period when the signal quality of the first communication link is lower than a second preset threshold; reporting is performed based on a period when a second communication link exists in the at least one second communication link, where a difference between signal quality of the second communication link and the signal quality of the first communication link is greater than a third preset threshold; signal quality of a currently used second communication link is lower than a fourth preset threshold; and a difference between the signal quality of the currently used second communication link and the signal quality of the first communication link is less than a fifth preset threshold, where the signal quality includes any one of reference signal received power RSRP, reference signal received quality RSRQ, a signal to interference plus noise ratio SINR, and a signal-to-noise ratio SNR.

In one embodiment, before the receiving, by the network device, a measurement report sent by the first terminal device, the method further includes: sending, by the network device, third measurement configuration information to the first terminal device, where the third measurement configuration information includes a measurement quantity of measurement to be performed by the first terminal device, and the measurement quantity includes at least one of reference signal received power RSRP, reference signal received quality RSRQ, a signal to interference plus noise ratio SINR, and a signal-to-noise ratio SNR.

In one embodiment, the method further includes: configuring, by the network device, a normalized parameter for the first terminal device; and sending, by the network device, the normalized parameter to the first terminal device, so that the first terminal device determines the at least one piece of measurement data by using the normalized parameter.

In one embodiment, the normalized parameter includes at least one of transmit power of the network device, transmit power of the at least one second terminal device configured by the network device, a first carrier frequency used by the first communication link, and the D2D carrier frequency.

In one embodiment, the at least one piece of measurement data is in a one-to-one correspondence with at least one to-be-selected second terminal device, where the at least one to-be-selected second terminal device is some or all of the at least one second terminal device, a communication link currently used by the first terminal device is the first communication link, the measurement report further includes at least one device identifier, and each device identifier is used to identify one to-be-selected second terminal device; and the sending, by the network device to the first terminal device, indication information of a communication link change policy determined based on the at least one piece of measurement data includes: determining, as a target second terminal device by the network device, a to-be-selected second terminal device corresponding to measurement data of best signal quality in the at least one piece of measurement data; and sending, by the network device, the indication information of the communication link change policy to the first terminal device, where the indication information carries a device identifier of the target second terminal device, and the communication link change policy instructs the first terminal device to connect to the target second terminal device.

In one embodiment, that the network device determines the communication link change policy based on the at least one piece of measurement data includes: the network device determines the target second terminal device from the at least one to-be-selected second terminal devices based on signal quality of the at least one piece of measurement data and a selection condition on a network device side.

In one embodiment, the at least one piece of measurement data is in a one-to-one correspondence with at least one to-be-selected second terminal device, where the at least one to-be-selected second terminal device is some or all of the at least one second terminal device, a communication link currently used by the first terminal device is the first communication link, and each of the at least one piece of measurement data has one index; and the sending, by the network device to the first terminal device, indication information of a communication link change policy determined based on the at least one piece of measurement data includes: determining, as target measurement data by the network device, measurement data of best signal quality in the at least one piece of measurement data, and determining an index of the target measurement data; and sending, by the network device, the indication information of the communication link change policy to the first terminal device, where the indication information carries the index of the target measurement data, and the communication link change policy instructs the first terminal device to connect to a target second terminal device corresponding to the target measurement data.

In one embodiment, a communication link currently used by the first terminal device is one of the at least one second communication link, and the measurement report includes measurement data of the currently used second communication link; and the sending, by the network device, indication information of the communication link change policy to the first terminal device includes: sending, by the network device, radio resource control information to the first terminal device, where the radio resource control information carries the indication information.

In one embodiment, the sending, by the network device, indication information of the communication link change policy to the first terminal device includes: when the network device determines that the signal quality of the second communication link is lower than the signal quality of the first communication link, sending, by the network device, connection release indication information to the first terminal device, where the connection release indication information is used to instruct the first terminal device to disconnect from the currently used second communication link and connect to the network device.

In one embodiment, the measurement data includes at least one of reference signal received power RSRP, reference signal transmit power, reference signal received quality RSRQ, a signal to interference plus noise ratio SINR, and a signal-to-noise ratio SNR, where the reference signal received power is received power at which the first terminal device receives, on the at least one second communication link, a reference signal sent by the at least one to-be-selected second terminal device, and the reference signal transmit power is transmit power required by the first terminal device to send, by using the at least one second communication link, a reference signal to the at least one to-be-selected second terminal device.

According to a second aspect, this application provides a communication method, applied to a communications system including a first terminal device, a network device, and at least one second terminal device, where the network device communicates with the first terminal device by using a first communication link, the first terminal device communicates with the at least one second terminal device by using at least one second communication link, and the at least one second terminal device is in a one-to-one correspondence with the at least one second communication link, and the method includes: sending, by the first terminal device, a measurement report to the network device, where the measurement report includes at least one piece of measurement data; receiving, by the first terminal device, indication information that is sent by the network device and that is of a communication link change policy determined by the network device based on the at least one piece of measurement data; and performing, by the first terminal device, change processing on a communication link based on the communication link change policy, where the communication link includes the first communication link and/or the second communication link.

In one embodiment, before the sending, by the first terminal device, a measurement report to the network device, the method further includes: receiving, by the first terminal device, first measurement configuration information sent by the network device, where the first measurement configuration information includes a device-to-device D2D carrier frequency used by the at least one second communication link, and the D2D carrier frequency includes at least one of a carrier frequency for D2D communication based on a Long Term Evolution LTE system, a carrier frequency for D2D communication based on a wireless local area network WLAN, and a carrier frequency for D2D communication based on Bluetooth.

In one embodiment, before the sending, by the first terminal device, a measurement report to the network device, the method further includes: receiving, by the first terminal device, second measurement configuration information sent by the network device, where the second measurement configuration information includes a reporting condition of the measurement report, and the reporting condition includes at least one of a second communication link whose signal quality is higher than a first preset threshold exists in the at least one second communication link; a second communication link whose signal quality is higher than signal quality of the first communication link exists in the at least one second communication link; reporting is performed based on a period when the signal quality of the first communication link is lower than a second preset threshold; reporting is performed based on a period when a second communication link exists in the at least one second communication link, where a difference between signal quality of the second communication link and the signal quality of the first communication link is greater than a third preset threshold; signal quality of a currently used second communication link is lower than a fourth preset threshold; and a difference between the signal quality of the currently used second communication link and the signal quality of the first communication link is less than a fifth preset threshold, where the signal quality includes any one of reference signal received power RSRP, reference signal received quality RSRQ, a signal to interference plus noise ratio SINR, and a signal-to-noise ratio SNR.

In one embodiment, before the sending, by the first terminal device, a measurement report to the network device, the method further includes: receiving, by the first terminal device, third measurement configuration information sent by the network device, where the third measurement configuration information includes a measurement quantity of measurement to be performed by the first terminal device, and the measurement quantity includes at least one of reference signal received power RSRP, reference signal received quality RSRQ, a signal to interference plus noise ratio SINR, and a signal-to-noise ratio SNR.

In one embodiment, the method further includes: receiving, by the first terminal device, a normalized parameter sent by the network device; and determining, by the first terminal device, the at least one piece of measurement data by using the normalized parameter.

In one embodiment, the normalized parameter includes at least one of transmit power of the network device, transmit power of the at least one second terminal device, a first carrier frequency used by the first communication link, and the D2D carrier frequency.

In one embodiment, the at least one piece of measurement data is in a one-to-one correspondence with at least one to-be-selected second terminal device, where the at least one to-be-selected second terminal device is some or all of the at least one second terminal device, a communication link currently used by the first terminal device is the first communication link, the measurement report further includes at least one device identifier, and each device identifier is used to identify one to-be-selected second terminal device; and the indication information carries a device identifier of a target second terminal device, where the target second terminal device is a second terminal device corresponding to measurement data that is determined by the network device and that is of best signal quality in the at least one piece of measurement data; and the performing, by the first terminal device, change processing on a communication link based on the communication link change policy includes: determining, by the first terminal device, the target second terminal device from the at least one to-be-selected second terminal device based on the device identifier of the target second terminal device, and connecting to the target second terminal device.

In one embodiment, the at least one piece of measurement data is in a one-to-one correspondence with at least one to-be-selected second terminal device, where the at least one to-be-selected second terminal device is some or all of the at least one second terminal device, and a communication link currently used by the first terminal device is the first communication link; and the indication information carries an index of target measurement data, and the target measurement data is measurement data that is determined by the network device and that is of best signal quality in the at least one piece of measurement data; and the performing, by the first terminal device, change processing on a communication link based on the communication link change policy includes: determining, by the first terminal device, the target measurement data from the at least one piece of measurement data based on the index, and connecting to a target second terminal device corresponding to the target measurement data.

In one embodiment, a communication link currently used by the first terminal device is one of the at least one second communication link, and the measurement report includes measurement data of the second communication link currently used by the first terminal device; and the receiving, by the first terminal device, indication information that is sent by the network device and that is of a communication link change policy includes: receiving, by the first terminal device, radio resource control information sent by the network device, where the radio resource control information carries the indication information.

In one embodiment, the receiving, by the first terminal device, indication information that is sent by the network device and that is of a communication link change policy includes: receiving, by the first terminal device, connection release indication information sent by the network device, where the connection release indication information is sent to the first terminal device when the network device determines that the signal quality of the currently used second communication link is lower than the signal quality of the first communication link; and disconnecting, by the first terminal device, a connection of the currently used second communication link according to the connection release indication information, and connecting to the network device.

In one embodiment, the measurement data includes at least one of reference signal received power RSRP, reference signal transmit power, reference signal received quality RSRQ, a signal to interference plus noise ratio SINR, and a signal-to-noise ratio SNR, where the reference signal received power is received power at which the first terminal device receives, on the at least one second communication link, a reference signal sent by the at least one to-be-selected second terminal device, and the reference signal transmit power is transmit power required by the first terminal device to send, by using the at least one second communication link, a reference signal to the at least one to-be-selected second terminal device.

According to a third aspect, this application provides a network device, configured to execute the method in the first aspect or any embodiment of the first aspect. In one embodiment, the network device includes a unit configured to execute the method in the first aspect or any embodiment of the first aspect.

According to a fourth aspect, this application provides a terminal device, configured to execute the method in the second aspect or any embodiment of the second aspect. In one embodiment, the terminal device includes a unit configured to execute the method in the second aspect or any embodiment of the second aspect.

According to a fifth aspect, this application provides a network device, where the network device includes a receiver, a transmitter, a processor, a memory, and a bus system. The receiver, the transmitter, the processor, and the memory are connected to each other by using the bus system, the memory is configured to store an instruction, and the processor is configured to execute the instruction stored by the memory, to control the receiver to receive a signal or control the transmitter to send a signal. When the instruction stored in the memory is executed, the processor executes the method in the first aspect or any embodiment of the first aspect.

According to a sixth aspect, this application provides a terminal device, where the terminal device includes a receiver, a transmitter, a processor, a memory, and a bus system. The receiver, the transmitter, the processor, and the memory are connected to each other by using the bus system, the memory is configured to store an instruction, and the processor is configured to execute the instruction stored by the memory, to control the receiver to receive a signal or control the transmitter to send a signal. When the instruction stored in the memory is executed, the processor executes the method in the second aspect or any embodiment of the second aspect.

According to a seventh aspect, this application provides a computer-readable medium, configured to store a computer program, and the computer program includes an instruction used to execute the method in the first aspect or any embodiment of the first aspect.

According to an eighth aspect, this application provides a computer-readable medium, configured to store a computer program, and the computer program includes an instruction used to execute the method in the second aspect or any embodiment of the second aspect.

According to the communication method, the network device, and the terminal device provided in this application, the terminal device can instantly measure the signal quality of the second communication link (for example, a PC5 communication link) and the first communication link (for example, a Uu communication link) when performing communication (for example, communication with the network device or D2D communication), and send the measured measurement data to the network device. The network device compares the measurement data of the second communication link with measurement data of the first communication link, to determine the communication link change policy of the terminal device, and further control the terminal device to use a communication link with lower power consumption for communication, thereby reducing power consumption of the terminal device.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may derive other drawings from these accompanying drawings without creative efforts.

DESCRIPTION OF EMBODIMENTS

Figure 1:
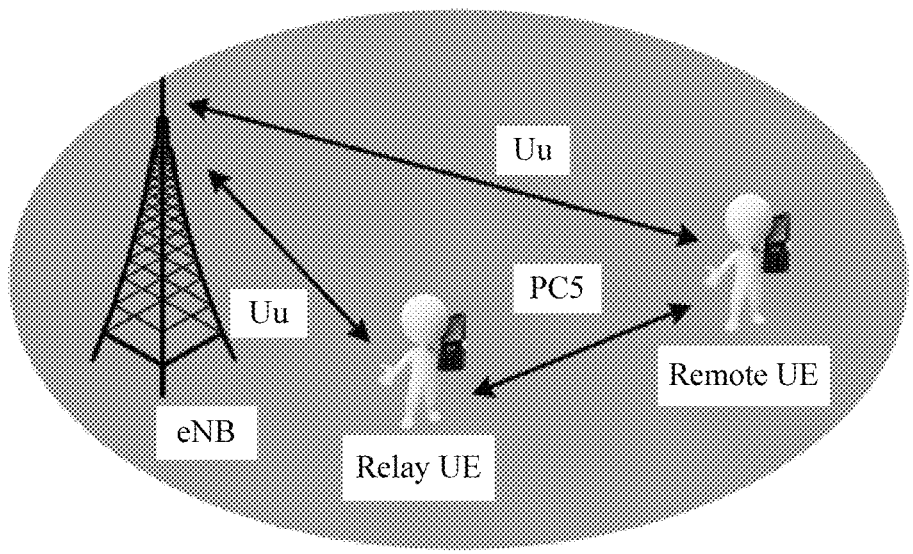
FIG. 1 shows a communication scenario in the prior art.

The following clearly describes the technical solutions in the embodiments of the present invention with reference to the accompanying drawings in the embodiments of the present invention. Apparently, the described embodiments are some rather than all of the embodiments of the present invention. All other embodiments obtained by a person of ordinary skill in the art based on the embodiments of the present invention without creative efforts shall fall within the protection scope of the present invention.

The technical solutions of the present invention may be applied to various communications systems that use wireless relay technologies (in other words, use relay nodes), such as an International Mobile Telecommunications-Advanced (IMT-Advanced) system, a Global System for Mobile Communications (GSM), a Code Division Multiple Access (CDMA) system, a Wideband Code Division Multiple Access (WCDMA) system, a general packet radio service (GPRS) system, and a Long Term Evolution (LTE) system.

The embodiments of the present invention are described with reference to a terminal device. The terminal device may also be referred to as user equipment (UE), a terminal, a mobile terminal, mobile user equipment, and the like, may communicate with one or more core networks over a radio access network (RAN). The terminal device may be a mobile terminal such as a mobile phone (also referred to as a "cellular" phone) and a computer with a mobile terminal. For example, the terminal device may be a portable, pocket-sized, handheld, computer built-in, or in-vehicle mobile apparatus, which exchanges voice and/or data with the radio access network. In the embodiments of the present invention, the terminal device includes a mobile phone, an intelligent terminal (a wearable device, a smartwatch, a smart meter, a smart water meter, or the like), a multimedia device, a streaming media device, and the like.

A base station or a data transceiver node may be a base transceiver station (BTS) in GSM or CDMA, or may be a NodeB in WCDMA, or may be an evolved NodeB (eNB or eNodeB) in LTE, or may be a data transceiver node on a network side in a next-generation communications system. This is not limited in the present invention. However, for ease of description, the following embodiments are described by using an eNodeB as an example.

It should be further understood that, an eNB is a bridge between UE in LTE (4G) and an evolved packet core (EPC). eNBs connect to each other over an X2 interface. Main functions of the eNBs include radio resource management, Internet Protocol (IP) header compression and user data stream encryption, mobility management entity (MME) selection during UE attaching, user plane data routing to a serving gateway (S-GW), paging message organization and sending, announcement message organization and sending, measurement and measurement report configuration for a mobility or scheduling purpose, and the like.

In a relay communications technology, one or more relay nodes are added between a base station and a terminal device, to forward, once or for a plurality of times, data to be transmitted between the base station and the terminal device.

In the embodiments of the present invention, that one relay node is added between the base station and the terminal device is used as an example for describing a communication method in the embodiments of the present invention.

In a cellular communications technology, a terminal device communicates with a base station over an air interface (for example, a Uu interface). By using the base station, data of the terminal device is forwarded to a destination node in a network or data from a network is forwarded to the terminal device.

A D2D communications technology is a technology for communication between terminals. Different from the existing cellular communications technology, in the D2D communications technology, data from terminal device does not need to be transmitted by using a base station, but is directly transmitted over an air interface (for example, a PC5 interface) between terminals. This reduces dependence of communication between terminal devices on a network and reduces a network forwarding latency and network load.

Current D2D technology supports group communication (namely, 1-to-many communication). In one embodiment, one D2D UE may send D2D data to several UEs in a communication group. D2D technology further supports unicast communication (namely, 1-to-1 communication). In one embodiment, one D2D UE may send D2D data to another UE.

FIG. 1 shows a communication scenario in the prior art. As shown in FIG. 1, remote UE (also referred to as a remote device or a remote terminal) is located in network coverage. In this case, the UE may directly communicate with an eNB by using a cellular communications technology, or may search for relay UE to perform D2D communication. Regardless of which case that the remote UE is in, if the remote UE has little electricity (or electric energy) remained or the remote UE has a relatively weak electric energy capability, and the remote UE performs communication at relatively high power, electricity (or electric energy) may be rapidly consumed and the communication is interrupted. Therefore, in the foregoing case, how to reduce power consumption of the remote UE to save electricity (or electric energy) of the remote UE becomes a problem that needs to be considered.

It should be noted that, in this embodiment of the present invention, the communication between the UE and the eNB is not limited. The eNB may further be an access point (AP) in a WLAN (Wi-Fi). Similarly, communication between UEs is not limited, either. A technology for the communication between UEs may be based on a PC5 interface of an LTE technology, or an interface of a WLAN (Wi-Fi) technology, or an interface of a Bluetooth technology.

For ease of understanding and description, the following describes a communication method in this embodiment of the present invention by using the communication between the UE and the eNB and that the communication between UEs is based on the PC5 interface of LTE as examples.

Related terms in the embodiments of the present invention are briefly described first Uu interface: interface for communication between UE and a base station PC5 interface: interface for communication between UEs Sidelink: a link for communication between UEs, corresponding to a PC5 interface Uplink: a link used by UE to send data to a base station Downlink: a link used by UE to receive data sent by a base station It should be noted that, in this embodiment of the present invention, change processing on a communication link performed by a first terminal device is applicable to two cases, to be specific, a case (denoted as case 1 for ease of description) in which the first terminal device changes an uplink or a downlink to a sidelink or a case (denoted as case 2 for ease of description) in which the first terminal device changes a sidelink to an uplink or a downlink.

Figure 2:
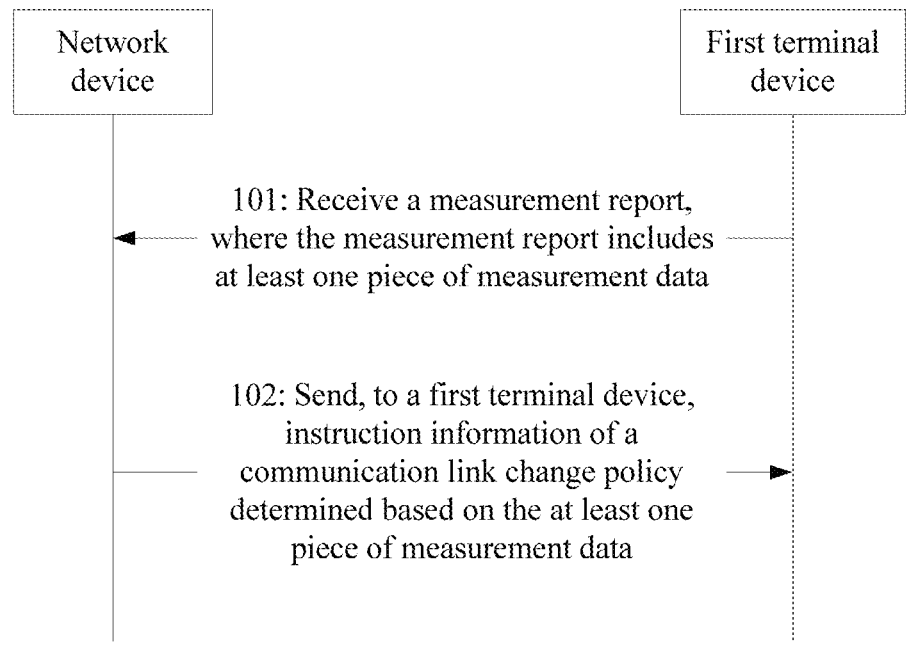
FIG. 2 is a schematic interaction diagram of a communication method according to an embodiment of the present invention.
Figure 3:
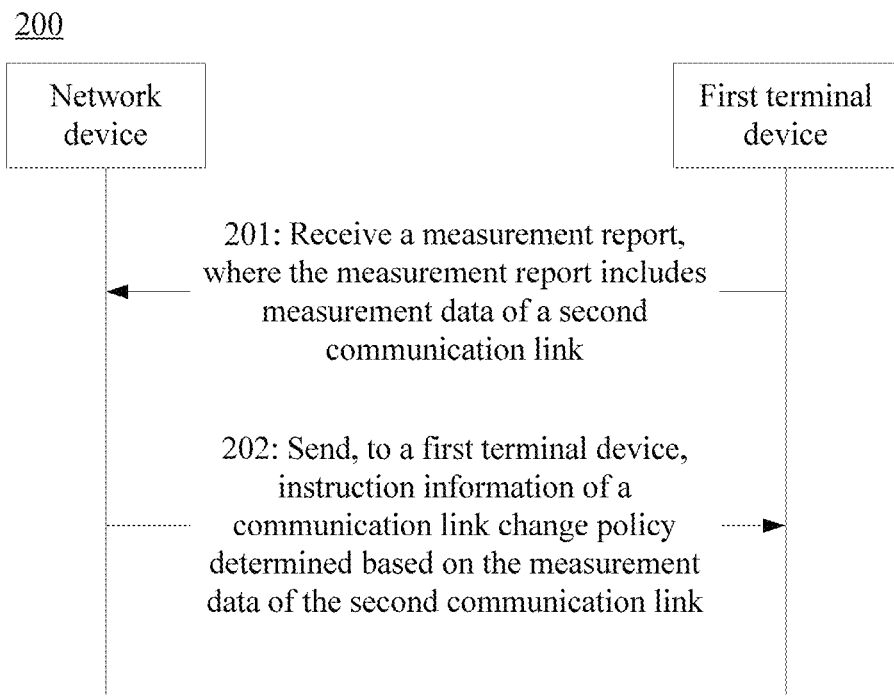
FIG. 3 is a schematic interaction diagram of a communication method according to another embodiment of the present invention.

The following describes application of the communication method in this embodiment of the present invention in each of the foregoing two cases with reference to FIG. 2 and FIG. 3.

Case 1

FIG. 2 is a schematic interaction diagram of a communication method 100 according to an embodiment of the present invention. This method is applied to a communications system including a network device, a first terminal device, and at least one second terminal device. The network device communicates with the first terminal device by using a first communication link. The first terminal device communicates with the at least one second terminal device by using at least one second communication link. The at least one second communication link is in a one-to-one correspondence with the at least one second terminal device. As shown in FIG. 2, the method 100 includes operations 101 and 102.

101: The network device receives a measurement report sent by the first terminal device, where the measurement report includes at least one piece of measurement data.

The at least one piece of measurement data is in a one-to-one correspondence with at least one to-be-selected second terminal device, where the at least one to-be-selected second terminal device is some or all of the at least one second terminal device.

In this embodiment of the present invention, the at least one piece of measurement data reported by the first terminal device all meets a reporting condition (the reporting condition is described in detail below). It can be understood that, remote UE reports at least one piece of measurement data. Actually, the remote UE reports at least one to-be-selected second communication link, and signal quality of at least one to-be-selected second communication link is higher than signal quality of the first communication link. Alternatively, the at least one to-be-selected second terminal device is used to forward data for the first terminal device, so that the first terminal device uses smaller transmit power or receive power when the first terminal device communicates with the base station.

It should be understood that, the at least one piece of measurement data each is obtained by measuring or estimating signal quality of a second communication link used when the first terminal device communicates with the at least one to-be-selected second terminal device.

In one embodiment, the measurement data may be reference signal received power or reference signal transmit power. The reference signal received power may be directly obtained by measurement by the first terminal device on the second communication link. The reference signal transmit power is obtained by estimating receive power used by the first terminal device to receive, by using the second communication link, a reference signal sent by the second terminal device.

It should be noted that, the first terminal device may report the measurement report to the network device directly or by using a relay device. When the first terminal device reports the measurement report by using a relay device, if reported measurement data includes measurement data of the first communication link, the first terminal device needs to perform the reporting based on the reporting condition provided in this embodiment of the present invention. The reporting condition is described in detail below. A process in which the first terminal device directly reports the measurement data of the first communication link may be the same as that in the prior art, and details are not described herein again.

102: The network device sends indication information of a communication link change policy to the first terminal device, where the indication information is used to instruct the first terminal device to perform change processing on a communication link based on the communication link change policy, and the communication link includes the first communication link and/or the second communication link.

In one embodiment, the network device determines the communication link change policy based on the at least one piece of measurement data.

In this embodiment of the present invention, there is a plurality of communication link change policies.

For example, the network device allows, based on the at least one piece of measurement data, the first terminal device to change the communication link. However, the network device does not determine a target second terminal device, but instructs the first terminal device to select one from at least one to-be-selected second terminal device corresponding to the at least one piece of measurement data as the target second terminal device.

Alternatively, the network device selects a to-be-selected terminal device second corresponding to measurement data of best signal quality or highest signal strength in the at least one piece of measurement data as the target second terminal device, and instructs the first terminal device to establish a connection to the target second terminal device.

Alternatively, the network device may select a plurality of to-be-selected second terminal devices based on the at least one piece of measurement data, and include device identifiers IDs of the plurality of to-be-selected second terminal devices into the indication information. After receiving the indication information, the first terminal device selects one from the plurality of to-be-selected second terminal devices indicated by the network device as the target second terminal device.

It should be noted that, in this embodiment of the present invention, that the network device determines the communication link change policy based on the at least one piece of measurement data includes: the network device determines the target second terminal device from the plurality of to-be-selected second terminal devices based on signal quality of the at least one piece of measurement data and a selection condition on a network device side.

For example, the network device determines the target second terminal device from the plurality of to-be-selected second terminal devices with reference to the signal quality and service types of the plurality of to-be-selected second terminal devices.

It should be understood that, the selection condition on the network device side may include a plurality of manners. The service type herein is merely used as an example for selecting the target second terminal device. It should be construed that, other selection conditions, changes, or the like on the network device side under the idea of the technical solutions in the embodiments of the present invention also fall into the protection scope of the embodiments of the present invention.

It should be noted that, the signal quality includes any one of reference signal received power RSRP, reference signal received quality RSRQ, a signal to interference plus noise ratio SINR, and a signal-to-noise ratio SNR.

In one embodiment, when indicating the target second terminal device, the network device may send an index of measurement data to the first terminal device, or the network device may include a device identifier of the target second terminal device into the indication information.

It should be understood that, the foregoing given communication link change policy is merely used as an example, and should not be construed as any limitation on a scope of the communication link change policy in the embodiments of the present invention.

According to the communication method in this embodiment of the present invention, when communicating with the network device by using the first communication link, the first terminal device may instantly measure signal quality of the second communication link (namely, D2D link), and report measured measurement data of the at least one second communication link to the network device. The network device compares the measurement data of the second communication link with measurement data of the first communication link, to determine the communication link change policy of the first terminal device, and further control the first terminal device to use a communication link with lower power consumption for communication, thereby reducing power consumption of the first terminal device.

Still further, because the at least one piece of measurement data reported by the first terminal device corresponds to the at least one to-be-selected second communication link, and the first terminal device uses the to-be-selected second communication link to communicate with the network device, smaller transmit power or receive power may be used to reduce the power consumption of the first terminal device.

In one embodiment, before the network device receives a measurement report sent by the first terminal device, the method further includes:

sending, by the network device, first measurement configuration information to the first terminal device, where the first measurement configuration information includes a device-to-device D2D carrier frequency used by the at least one second communication link, and the D2D carrier frequency includes at least one of the following:

a carrier frequency for D2D communication based on a Long Term Evolution LTE system, a carrier frequency for D2D communication based on a wireless local area network WLAN, and a carrier frequency for D2D communication based on Bluetooth.

In this embodiment of the present invention, the eNB configures a new measurement object (to be specific, configures a carrier frequency for D2D communication) for the remote UE, and the eNB may control the remote UE to perform measurement on the measurement object. This can reduce power consumption caused by automatically enabling measurement by the first terminal device in the prior art.

In one embodiment, before the network device receives a measurement report sent by the first terminal device, the method further includes:

sending, by the network device, second measurement configuration information to the first terminal device, where the second measurement configuration information includes a reporting condition of the measurement report.

It should be noted that, the first measurement configuration information and the second measurement configuration information may be a same piece of measurement configuration information. In other words, the D2D carrier frequency and the reporting condition that are configured by the network device may be simultaneously delivered to the first terminal device by using a same piece of measurement configuration information, or may be separately sent to the first terminal device. The present invention imposes no specific limitation thereto.

In one embodiment, the method further includes:

configuring, by the network device, a normalized parameter for the first terminal device; and sending, by the network device, the normalized parameter to the first terminal device, so that the first terminal device determines the at least one piece of measurement data by using the normalized parameter.

In one embodiment, before the network device receives the measurement report sent by the first terminal device, the network device needs to send the measurement configuration information to the first terminal device, to indicate the measurement object on which the first terminal device needs to perform measurement and the condition for reporting measurement data. In addition, the network device needs to send the normalized parameter to the first terminal device, so that the first terminal device performs measurement based on the measurement configuration information to obtain a measurement result. The first terminal device needs to simultaneously measure signal quality of a Uu communication link and signal quality of a PC5 communication link in this embodiment of the present invention. It can be understood that, because reference signals sent by the network device and a terminal device are different, structures of the reference signals, technologies used to send the reference signals, and the like are also different. Therefore, directly comparing measurement results is improper, and normalized processing needs to be performed on the measurement results. The first terminal device performs the normalized processing on the measurement results by using the normalized parameter, to obtain comparable data and further determine the at least one piece of measurement data that meets the reporting condition. Moreover, the first terminal device reports only the at least one piece of measurement data that meets the reporting condition to the network device, so that the network device determines the communication link change policy of the first terminal device based on the at least one piece of measurement data.

Case 2

FIG. 3 is a schematic interaction diagram of a communication method 200 according to another embodiment of the present invention. As shown in FIG. 3, the method 200 includes operations 201 and 202.

201: A network device receives a measurement report sent by a first terminal device, where the measurement report includes measurement data of a currently used second communication link.

It should be understood that, in this case, the measurement report may include only one piece of measurement data, namely, the measurement data of the currently used second communication link.

The measurement report is sent to the network device when the first terminal device communicates with a second terminal device by using the currently used second communication link.

It should be noted that, in case 2, a current state of the first terminal device is that the first terminal device is connected to a second terminal device. In other words, the first terminal device is currently performing D2D link communication. In a process of communicating with the second terminal device, the first terminal device may measure signal quality of a Uu communication link (namely, the first communication link) based on measurement configuration information indicated by the network device. When the signal quality of the Uu communication link is better than signal quality of a currently used PC5 communication link (namely, the currently used second communication link), the first terminal device sends the measurement data of the currently used second communication link to the network device.

Herein, the first terminal device may report the measurement report to the network device directly or by using a relay device. When the first terminal device reports the measurement report by using a relay device, if reported measurement data includes measurement data of the first communication link, the first terminal device may perform the reporting based on a reporting condition provided in this embodiment of the present invention. A process in which the first terminal device directly reports the measurement data of the first communication link may be the same as that in the prior art, and details are not described herein again.

202: The network device sends indication information of a communication link change policy to the first terminal device.

The indication information is used to instruct the first terminal device to perform change processing on a communication link based on the communication link change policy, where the communication link includes the first communication link and/or the second communication link.

In one embodiment, the network device determines the communication link change policy based on the measurement data of the second communication link. The network device compares the measurement data of the second communication link with the measurement data of the first communication link, to determine the communication link change policy. The network device sends the indication information of the communication link change policy to the first terminal device, to instruct the first terminal device to perform change processing on the communication link based on the communication link change policy indicated by the network device.

In the foregoing two cases, the first terminal device further needs to report the measurement data of the first communication link to the network device. If the first terminal device reports the measurement data of the first communication link by using a relay device, the first terminal device may perform the reporting based on the reporting condition provided in this embodiment of the present invention. If the first terminal device directly reports the measurement data of the first communication link to the network device, a specific reporting process may be the same as that in the prior art, and details are not described herein again.

It should be understood that, in case 2, before the network device receives the measurement report sent by the first terminal device, the network device further needs to send the measurement configuration information and a normalized parameter to the first terminal device, where the measurement configuration information includes a measurement object (for example, a carrier frequency for D2D communication) and the reporting condition. For descriptions of the carrier frequency for D2D communication and the normalized parameter, refer to the descriptions in the foregoing case 1, and details are not described herein again.

In case 2, the reporting condition may include at least one of the following: the signal quality of the currently used second communication link is lower than a fourth preset threshold; and a difference between the signal quality of the currently used second communication link and the signal quality of the first communication link is lower than a fifth preset threshold.

It should be noted that, a first preset threshold, a second preset threshold, a third preset threshold, the fourth preset threshold, and the fifth preset threshold are merely used for differentiating between different thresholds and have no necessary connection or value relationship between each other.

It should be further noted that, in this embodiment of the present invention, the signal quality includes any one of reference signal received power RSRP, reference signal received quality RSRQ, a signal to interference plus noise ratio SINR, and a signal-to-noise ratio SNR.

According to the communication method in this embodiment of the present invention, when communicating with the second terminal device by using the second communication link, the first terminal device may instantly measure the signal quality of the first communication link (for example, the Uu communication link), and report the signal quality of the first communication link to the network device, so that the network device may compare the measurement data of the second communication link (for example, the PC5 communication link) with the measurement data of the first communication link, and further control the first terminal device to use a communication link with lower power consumption for communication, thereby reducing power consumption of the first terminal device.

The following describes the communication method in this embodiment of the present invention by using an example with reference to a plurality of embodiments. It should be noted that, in the following embodiments, remote UE (also referred to as a remote device) is merely used as an example of the first terminal device and relay UE is merely used as an example of the second terminal device. This should not be construed as any limitation on an application scope of the communication method in this embodiment of the present invention.

Figure 4A:
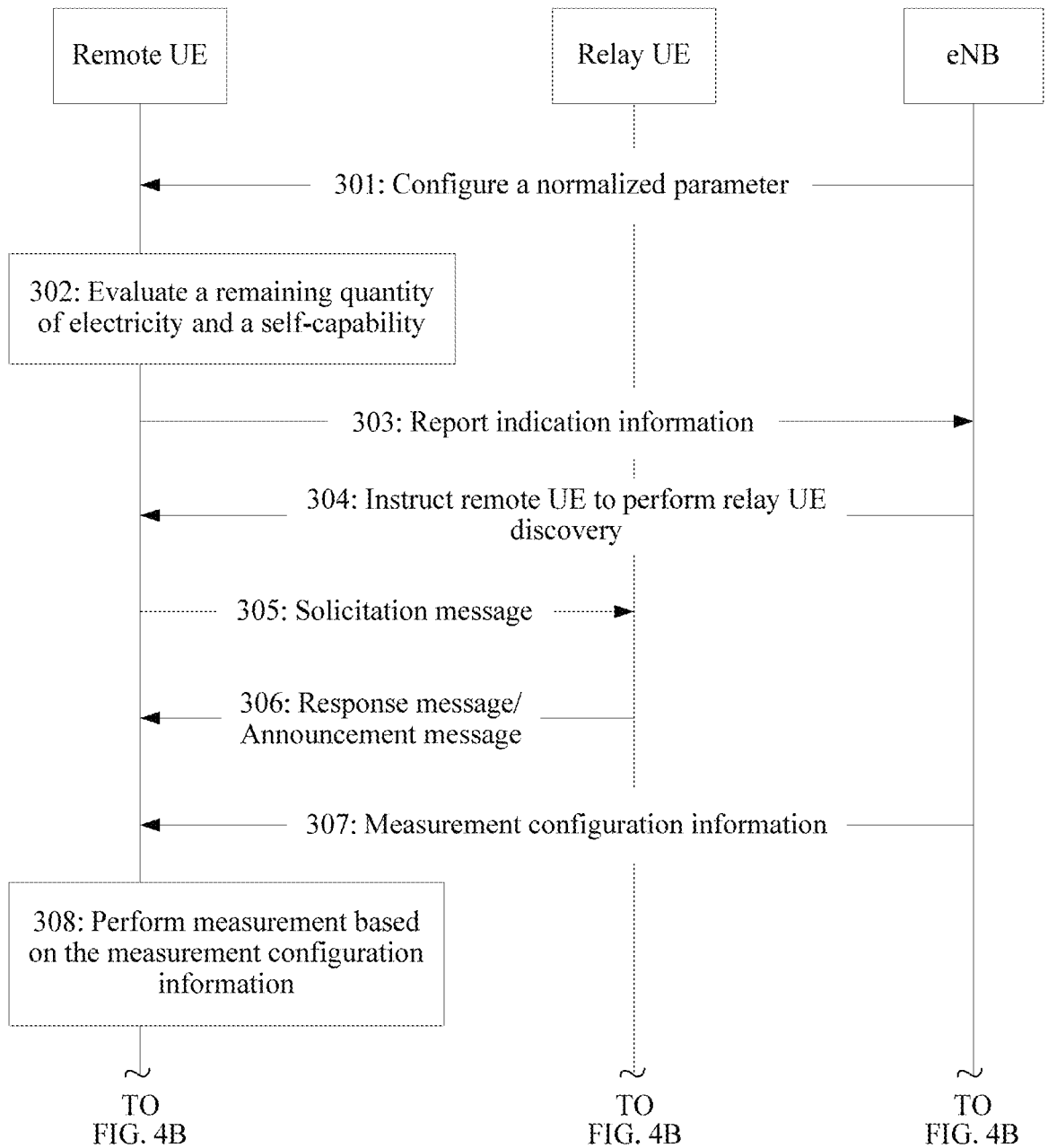
FIG. 4A and FIG. 4B are a schematic interaction diagram of a communication method according to still another embodiment of the present invention.
Figure 4B:
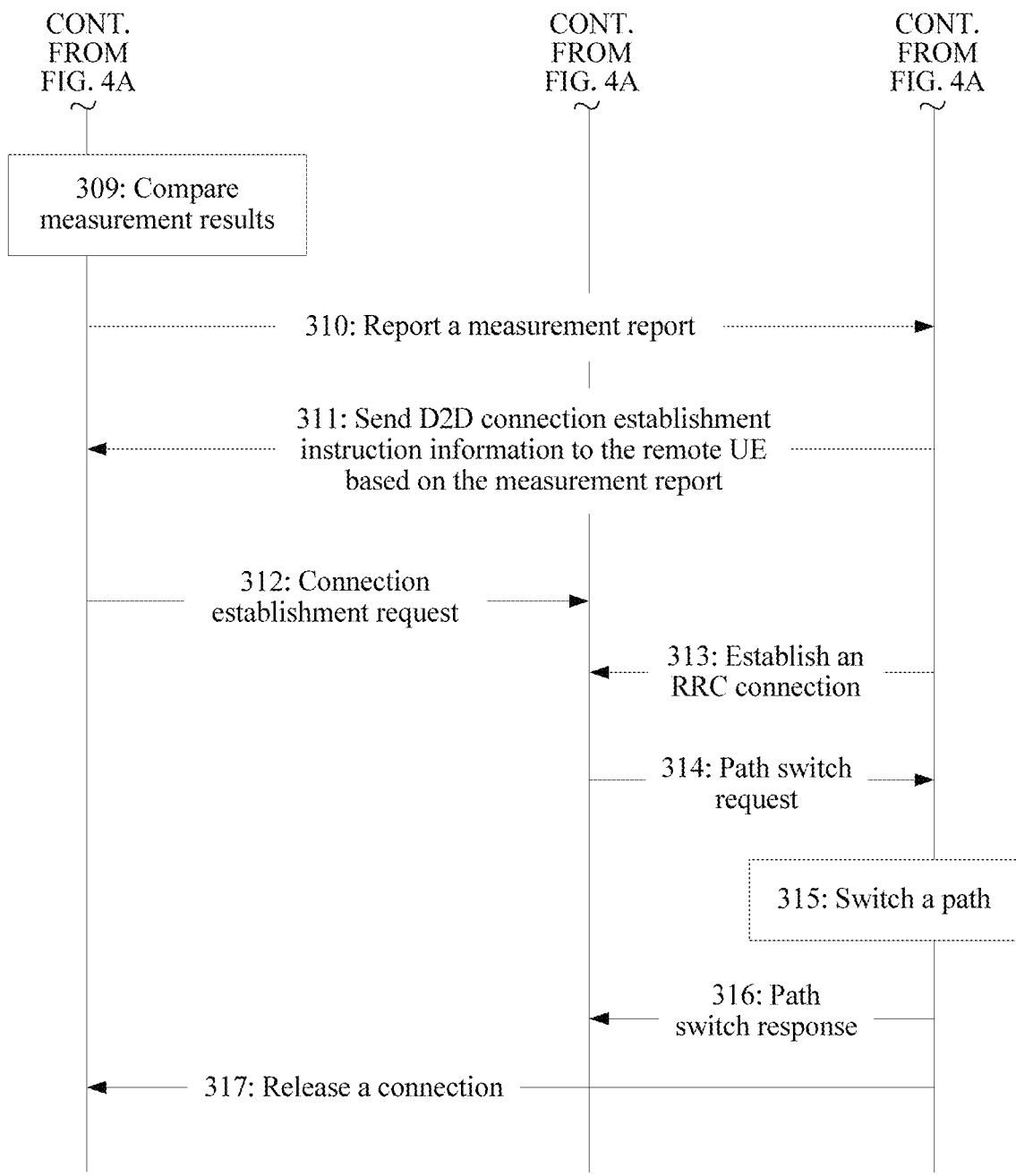

FIG. 4A and FIG. 4B are a schematic interaction diagram of a communication method according to an embodiment of the present invention. As shown in FIG. 4A and FIG. 4B, a main procedure includes operations 301 to 317.

It should be noted that, this embodiment is applicable to a case in which remote UE and an eNB are currently in a connected state (also referred to as a radio resource control connected RRC_CONNECTED state).

301: The eNB configures a unifiedparameter for the remote UE.

In addition, the unifiedparameter may also be referred to as normalization parameter. The normalized parameter is used by the remote UE to perform normalized processing on a measurement result.

It can be understood that, in this embodiment of the present invention, the remote UE needs to perform measurement on relay UE and the eNB. However, transmit power of the relay UE and that of the eNB may be different, or objects of the measurement performed by the remote UE on the relay UE and the eNB may be different, or density of a reference signal sent by the relay UE is less than that of the eNB, or transmit strength of a reference signal sent by the relay UE is less than that of the eNB, or the like. Measurement data is incomparable if direct comparison is performed. Therefore, the eNB needs to configure a normalized parameter for the remote UE, so that the remote UE performs normalized processing on measured measurement results of the relay UE and the eNB, to obtain comparable measurement data.

In one embodiment, in this embodiment of the present invention, the normalized parameter may include at least one of the following parameters: transmit power of the eNB, transmit power of at least one relay UE configured by the network device, a first carrier frequency used by a first communication link, a D2D carrier frequency, and a threshold for comparing measurement results.

302: The remote UE evaluates a remaining quantity of electricity of the remote UE and a self-capability.

When having sufficient electricity, the remote UE may not use the relay UE to perform communication. The remote UE may use the relay UE to perform communication only when the remaining quantity of electricity is small.

That the remote UE evaluates a self-capability is that the remote UE evaluates whether the remote UE has a capability of searching for relay UE and using the relay UE to perform communication with the eNB.

In this embodiment of the present invention, no conditional limitation is imposed on the relay UE searching performed by the remote UE. The remote UE may search for relay UE any time when the remote UE performs communication with the eNB, instead of searching for relay UE only when the remaining quantity of electricity is less than a preset threshold.

Compared with the prior art, in this embodiment of the present invention, no threshold limitation is imposed on the relay UE searching performed by the remote UE. Therefore, the relay UE searching performed by the remote UE is more flexible.

303: The remote UE reports indication information to the eNB.

In one embodiment, the indication information may indicate that the remote UE has insufficient electricity, or indicates the remaining quantity of electricity of the remote UE. Alternatively, the indication information may further indicate that the remote UE has the capability of searching for relay UE and using the relay UE to perform communication with the eNB.

In operation 303, the reported indication information may be triggered by using an electricity threshold. To be specific, in operation 301, the eNB may configure an electricity threshold for the remote UE, and operation 302 is triggered only when a quantity of electricity of the remote UE is less than the threshold. With the electricity threshold specified, a quantity of remote UEs that search for relay UE may be controlled, to reduce power consumption of the relay UE.

Alternatively, in operation 303, the reported indication information may be triggered by using a signal quality threshold. To be specific, in operation 301, the eNB sets a signal quality threshold for the remote UE. Operation 302 is triggered when signal quality of a reference signal that is sent by the eNB and that is received by the remote UE is lower than the signal quality threshold.

The foregoing operations 301, 302, and 303 are optional operations.

304: The eNB instructs the remote UE to perform relay UE discovery.

In one embodiment, the eNB may instruct, based on a load status of the eNB after receiving the indication information reported by the remote UE, the remote UE to search for relay UE. Alternatively, the eNB directly instructs the remote UE to perform relay UE discovery. Performing relay UE discovery herein should not be limited only to discovering relay UE, and may also be instructing, by the eNB, the remote UE to connect to the relay UE.

If an LTE technology is used for communication between UEs, the eNB needs to allocate D2D resources to UEs that perform D2D communication. In LTE, the D2D resources allocated by the eNB are uplink resources scheduled by the eNB for uplink communication between the eNB and UE. If these uplink resources are used as D2D resources, resources scheduled by the eNB for other UEs are interfered with or reduced. Therefore, when the eNB allocates D2D resources, if load of the eNB is not heavy, the eNB is capable of providing these D2D resources, to instruct the remote UE to search for relay UE. However, if the load of the eNB is heavy, the eNB may be incapable of providing these D2D resources. In this case, the eNB does not instruct the remote UE to search for relay UE.

305: The remote UE sends a solicitation message (solicitation) to search for the relay UE.

In one embodiment, the remote UE sends the solicitation message. Relay UE receiving the solicitation message replies to the remote UE with a response message (Response). In this way, the remote UE receiving this response message (Response) can find that there is relay UE nearby (mode 1). Alternatively, relay UE periodically sends announcement messages (Announcement). When the remote UE needs to search for relay UE, the remote UE may listen to the announcement message (Announcement). If detecting this message through listening, the remote UE may find that there is relay UE near the remote UE (mode 2).

The foregoing modes 1 and 2 are modes for discovering (or searching for) relay UE by the remote UE. The two modes may be implemented through the prior art, and details are not described herein.

307: The eNB sends measurement configuration information to the remote UE.

The eNB needs to configure the remote UE to perform signal measurement and measurement data (namely, measurement result) reporting.

It should be noted that operation 307 may be executed after operation 306. Optionally, operation 307 may also be executed after operation 303. If operation 307 is executed after operation 303, the measurement configuration information configured by the eNB for the remote UE may be sent to the remote UE in operation 304.

The measurement configuration information may include a measurement object and a reporting condition.

(1) Measurement Object

Herein, the measurement object may include any one or more of carrier frequencies of Universal Mobile Telecommunications System Terrestrial Radio Access (UTRA), evolved Universal Mobile Telecommunications System Terrestrial Radio Access (EUTRA), a Global System for Mobile Communications/Enhanced Data rates for GSM Evolution radio access network (GERAN), Code Division Multiple Access (CDMA) 2000, and a wireless local area network (WLAN). Measurement of the foregoing carrier frequencies may be the same as that in the prior art.

Different from the prior art, in this embodiment of the present invention, the eNB may further configure the D2D carrier frequency for the remote UE. The D2D carrier frequency may include at least one of a carrier frequency for D2D communication based on a Long Term Evolution LTE system, a carrier frequency for D2D communication based on a wireless local area network WLAN, or a carrier frequency for D2D communication based on Bluetooth.

In this embodiment of the present invention, the eNB configures a new measurement object (to be specific, configures the carrier frequency for D2D communication) for the remote UE, and the eNB may control the remote UE to perform measurement on different measurement objects. This can reduce power consumption caused by automatically enabling measurement by the remote UE in the prior art.

(2) Reporting Condition

In this embodiment of the present invention, when the reporting condition is met, the remote UE sends a measurement report to the eNB.

In one embodiment, the reporting condition may include at least one of the following:

a second communication link whose signal quality is higher than a first preset threshold exists in at least one second communication link;

a second communication link whose signal quality is higher than signal quality of the first communication link exists in the at least one second communication link;

reporting is performed based on a period when the signal quality of the first communication link is lower than a second preset threshold; and reporting is performed based on a period when a second communication link exists in the at least one second communication link, where a difference between signal quality of the second communication link and the signal quality of the first communication link is greater than a third preset threshold.

In this embodiment of the present invention, the remote UE may report the measurement report according to a trigger or a new period.

In one embodiment, reporting according to a trigger may include the following cases:

Reporting is triggered when signal quality of a D2D communication link (corresponding to a second communication link) is higher than a threshold, in other words, when the remote UE finds that relay UE is at a close distance to the remote UE.

Reporting is triggered when signal quality of a D2D communication link is higher than a threshold of signal quality of a Uu communication link (corresponding to the first communication link).

Reporting based on a period includes the following cases:

Reporting is performed based on a period when signal quality of a D2D communication link is higher than a threshold of signal quality of a Uu communication link.

Reporting is performed based on a period when signal quality of a D2D communication link is lower than a threshold.

In this embodiment of the present invention, the eNB configures a new measurement reporting condition for the remote UE, so that the remote UE can be instantly triggered to report measurement data when the remote UE discovers a PC5 link that consumes less power or has better signal quality than a Uu link. In this way, the eNB can instantly decide whether a communication link currently used by the remote UE needs to be changed.

308: Perform measurement based on the measurement configuration information.

The remote UE receives the measurement configuration information sent by the eNB, performs measurement based on the measurement object configured by the eNB, and reports measured measurement data (or a measurement result) based on the reporting condition.

In one embodiment, the remote UE may obtain the signal quality of the D2D communication link by measuring the following parameter:

receive power of the announcement message or the response message or another reference signal that is sent by the relay UE in operation 305, where in the prior art, receive power of a reference signal of the announcement message or the response message is defined as sidelink discovery received signal reference power (SD-RSRP); or receive power of an announcement signal sent by the relay UE by using a WLAN or Bluetooth (BT) technology in operation 305.

In this way, the remote UE can measure the signal quality of the D2D communication link.

In addition, the remote further needs to measure the signal quality of the first communication link when the remote UE communicates with the eNB by using the first communication link. Measurement of signal quality of a reference signal sent by the eNB may be the same as that in the prior art, and details are not described herein.

309: The remote UE compares measurement results.

It can be learned from the foregoing operation 308 that, the remote UE separately measures the signal quality of the D2D communication link (namely, the second communication link) and the signal quality of the Uu communication link (namely, the first communication link). The remote UE compares the signal quality of the D2D communication link with the signal quality of the Uu communication link, to determine the measurement data that meets the reporting condition.

When comparing measurement data, the remote UE needs to use the normalized parameter sent by the eNB in operation 301 to perform normalized processing on the measured measurement data of the D2D communication link and the Uu communication link.

The following describes a method for using the normalized parameter by using an example.

It is assumed that the normalized parameter sent by the eNB to the remote UE in operation 301 is transmit power $P_{eNB0}$ of the eNB and transmit power $P_{relay0}$ of the relay UE. The transmit power of the relay UE is transmit power configured by the eNB for use by the relay UE. In addition, if strength or quality that is measured by the remote UE and that is of signals transmitted by the eNB and the relay UE is separately $P_{eNB}$ and $P_{relay}$, normalized results are $N_{eNB}=P_{eNB}/P_{eNB0}$ and $N_{relay}=P_{relay}/P_{relay0}$. Next, the remote UE can directly compare the normalized results $N_{eNB}$ and $N_{relay}$.

It can be easily understood that, the remote UE may measure signal quality of a plurality of D2D communication links (in other words, the remote UE may discover a plurality of relay UEs), and D2D communication is performed on the plurality of D2D communication links based on different technologies, for example, some D2D communication links are based on an LTE technology while some D2D communication links are based on a Bluetooth technology. In this case, the eNB configures a plurality of sets of normalized parameters. D2D communication links established based on a same technology use a same set of normalized parameters. For example, second terminal devices corresponding to second communication links that are based on the LTE technology use one set of normalized parameters, while second terminal devices corresponding to second communication links that are based on the Bluetooth technology use another set of normalized parameters.

In operation 309, by comparing results obtained after the normalized processing, the remote UE can determine the measurement data that meets the reporting condition (referring to the description of the reporting condition in operation 307).

310: Report a measurement report.

In operation 310, the remote UE may discover a plurality of relay UEs, and if the plurality of relay UEs all have measurement data that meets the reporting condition, the remote UE may perform the reporting in either of the following manners:

(1) The remote UE reports only the measurement data that meets the reporting condition.

In this reporting manner, because a plurality of pieces of measurement data reported by the remote UE is sent in a form of a list, the remote UE determines an index of each piece of measurement data in the list. In contrast, when receiving the list of the plurality of pieces of measurement data, the eNB determines an index that is corresponding to each piece of measurement data and that is the same as that determined by the UE. In this way, for the eNB and the remote UE, measurement data can be distinguished by using indexes. In other words, a same index is corresponding to a same piece of measurement data on both an eNB side and a remote UE side. That is, the remote UE reports the measurement report to the eNB based on the list. Therefore, each piece of reported measurement data is corresponding to one index in the list.

(2) The remote UE reports both the measurement data that meets the reporting condition and a device identifier ID of relay UE corresponding to the measurement data.

In this reporting manner, the remote UE may select a plurality of reporting forms:

the remote UE reports measurement data, of all relay UEs, that meets the reporting condition, and device IDs of the corresponding relay UEs to the eNB; or the remote UE reports measurement data, of relay UE, that meets the reporting condition and that has best signal quality, and a device ID of the corresponding relay UE to the eNB (in this form, the remote UE may report only the device ID of the relay UE that has best quality); or the remote UE reports measurement data that meets the reporting condition, that has best signal quality, and that is of relay UE served by a same eNB as the remote UE, and a device ID of the corresponding relay UE to the eNB; or the remote UE reports measurement data that meets the reporting condition and that is of relay UE served by a same eNB as the remote UE, and a device ID of the corresponding relay UE to the eNB.

It should be noted that, in this embodiment of the present invention, "good" signal quality may be measured from two aspects. In one aspect, "good" signal quality means that the remote UE uses lower receive power, has better received quality, has a higher signal to noise ratio, or the like when receiving a signal. In the other aspect, "good" signal quality further means that the remote UE performs communication at lower power consumption (or means that the remote UE can use lower transmit power).

311: The eNB sends D2D connection establishment indication information to the remote UE based on the measurement report.

In operation 311, the eNB determines, based on the measurement data reported by the remote UE, that the remote UE needs to connect to the relay UE.

If the remote UE reports only the measurement data that meets the reporting condition in operation 310, the eNB may select one piece of measurement data of best signal quality or highest signal strength from the plurality of pieces of measurement data, and send an index of the measurement data to the remote UE. To be specific, the eNB instructs the remote UE to establish a connection to relay UE corresponding to the index (namely, target relay UE).

If the remote UE reports both the measurement data and the device IDs corresponding to the measurement data in operation 310, the eNB may select one piece of measurement data of best quality or highest signal strength from the plurality of pieces of measurement data, and send a device ID corresponding to the measurement data to the remote UE. In this way, the remote UE may determine, based on the device ID, the relay UE indicated by the eNB (namely, target relay UE).

It should be noted that, that the eNB determines, based on only signal quality or signal strength, that the remote UE needs to establish a connection to the relay UE is used only as an example for description above. Obviously, the eNB may further perform selection with reference to other factors or parameters. This embodiment of the present invention imposes no limitation thereto.

312: The remote UE sends a connection establishment request to the relay UE.

After receiving the D2D connection establishment indication information sent by the eNB, the remote UE sends the connection establishment request to the relay UE. Operation 312 may be the same as that in the prior art.

Operations 313 to 317: Change a communication link.

In one embodiment, a process of changing a communication link (or in other words, switching a path) in operations 313 to 317 may be the same as that in the prior art, and details are not described herein.

In this embodiment, the remote UE compares signal quality of a Uu link with signal quality of a PC5 link. When the signal quality of the PC5 interface is better than the signal quality of the Uu link, the remote UE reports the measurement data to the eNB, so that the eNB changes a communication link for the remote UE based on the measurement data. In this way, power consumption of the remote UE can be reduced.

Figure 5:
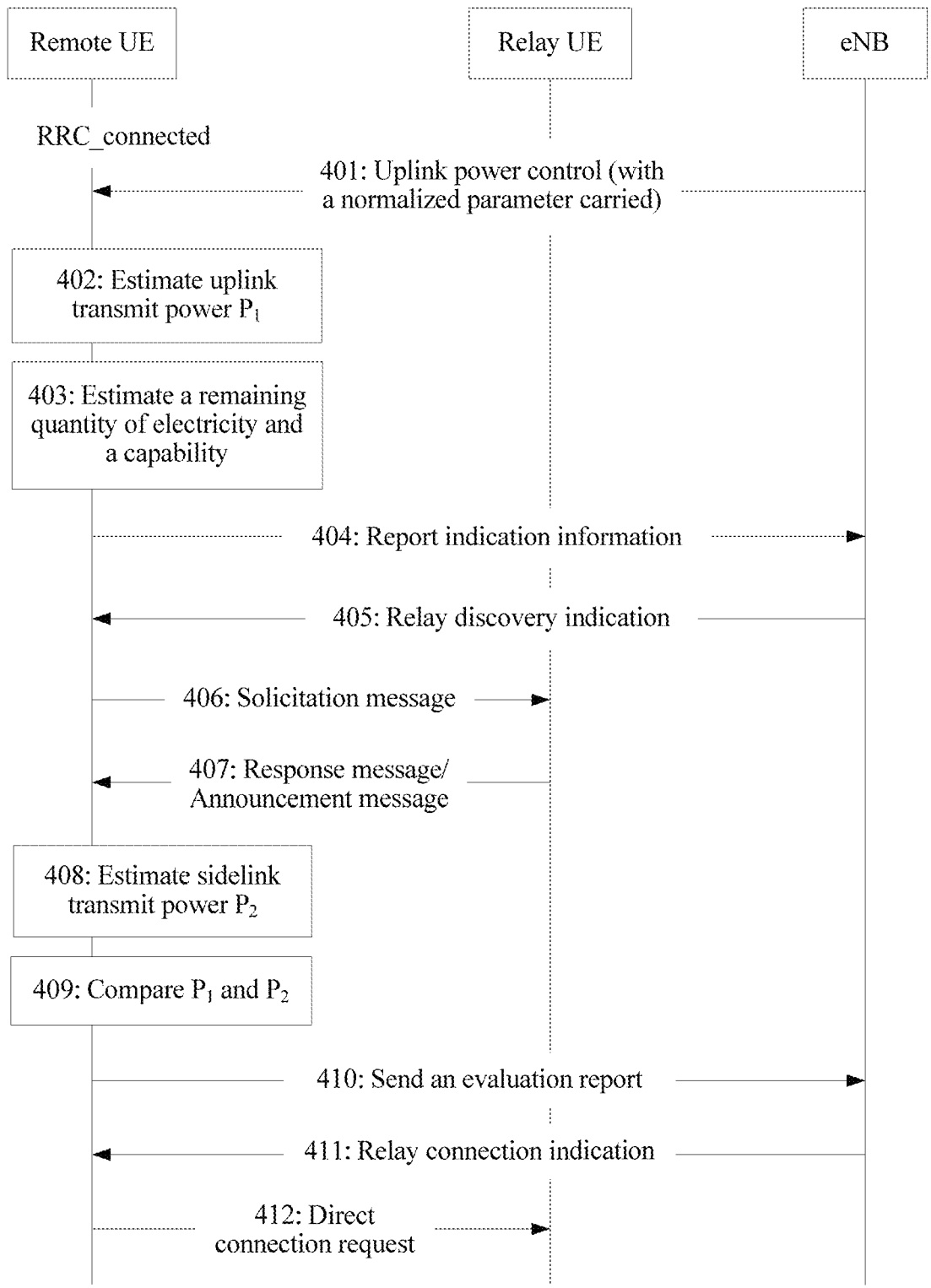
FIG. 5 is a schematic interaction diagram of a communication method according to yet another embodiment of the present invention.

FIG. 5 is a schematic interaction diagram of a communication method according to another embodiment of the present invention. As shown in FIG. 5, a main procedure includes operations 401 to 418.

It should be noted that, this embodiment is applicable to a case in which remote UE and an eNB are currently in a connected state (also referred to as a radio resource control connected (RRC_CONNECTED) state).

401: The eNB sends uplink power control configuration information to the remote UE.

In operation 401, the eNB performs uplink power control on the remote UE, and a specific process may be the same as that in the prior art.

It should be noted that, in operation 401, the eNB may include a normalized parameter into the uplink power control configuration information. For a description of the normalized parameter, refer to operation 301 above. In addition, for use of the normalized parameter, refer to operation 309 above.

402: The remote UE estimates uplink transmit power.

In one embodiment, the remote UE estimates uplink power (or reference signal transmit power of the remote UE) based on the uplink power control configuration information sent by the eNB in operation 401 and measurement performed on the eNB. For ease of description, the uplink power of the remote UE is denoted as $P_1$ below. A method for estimating $P_1$ is as follows:

$P_1$=Open-loop power control point+Dynamic offset

Open-loop power control point=Nominal power $P_0$+Open-loop path loss compensation $\alpha \times$Path loss PL The nominal power $P_0$ and open-loop path loss compensation $\alpha$ are configured by the eNB in measurement configuration information for the remote UE.

The path loss PL is obtained by subtracting downlink reference signal RSRP measured by the remote UE from reference signal transmit power configured by the eNB. That is, Path loss PL=Transmit power value of a reference signal sent by the eNB−Power value of the reference signal measured by the remote UE The dynamic offset may be understood as a power value incremented or decremented based on the open-loop power control point. In one embodiment, the dynamic offset includes two parts: power control based on a modulation and coding scheme (Modulation and Coding Scheme, MCS) and closed-loop power control.

It should be understood that, different MCSs correspond to different power. Therefore, the foregoing MCS-based power control is that the eNB adjusts power by adjusting an MCS of the remote UE.

The closed-loop power control is that a transmit power control (TPC) command is used to instruct the remote UE to offset a transmit power value.

403: The remote UE evaluates a remaining quantity of electricity and a capability.

404: The remote UE reports indication information.

405: The eNB sends a relay discovery indication to the remote UE.

The foregoing operations 402 to 405 are optional operations.

406: The remote UE sends a solicitation message.

407: Relay UE sends a response message to the remote UE or relay UE sends announcement messages based on a period.

It should be noted that, in operation 407, the response message or the announcement message sent by the relay UE carries transmit power $P_2$ of the relay UE.

Herein, for operations 403 to 407, refer to operations 302 to 306 above, and details are not described herein again.

408: The remote UE estimates transmit power of a sidelink (namely, a D2D communication link).

In one embodiment, the remote UE estimates transmit power on a PC5 interface. In an estimation process, the remote UE needs to use the transmit power value of the relay UE. The remote UE may obtain the transmit power of the relay UE through operation 407.

409: The remote UE compares values of $P_1$ and $P_2$.

410: The remote UE reports an estimation report to the eNB.

For a process in which the remote UE reports the estimation report to the eNB, refer to operation 310 above.

Correspondingly, after receiving the estimation report, the eNB selects relay UE (namely, target relay UE) corresponding to data (a power value herein) of best signal quality or highest signal strength from the estimation report.

411: The eNB sends a relay connection indication to the remote UE.

The eNB instructs the remote UE to establish a connection to the target relay UE.

412: The remote UE sends a direct connection request to target relay UE.

A communication link change process is performed subsequently, where the remote UE switches from a Uu interface to a PC5 interface of the target relay UE. A specific procedure may be the same as that in the prior art, and details are not described herein.

In this embodiment, the remote UE estimates transmit power on the Uu interface and the transmit power on the PC5 interface based on the uplink transmit power. Transmit power of a Uu communication link and transmit power of a PC5 communication link are compared to determine a communication link with lower power consumption, and an estimation result is reported to the eNB, so that eNB controls a communication link change of the remote UE, thereby reducing power consumption of the remote UE.

In the foregoing embodiment, when the remote UE is already connected to several relay UEs, the eNB may select, from the several relay UEs based on at least one piece of measurement data reported by the remote UE, some relay UEs that need to be released, and instruct the remote UE to release the selected relay UEs.

Alternatively, when the remote UE is already connected to several relay UEs, the eNB may add several relay UEs for the remote UE based on at least one piece of measurement data reported by the remote UE.

For example, if the eNB finds, based on the measurement data reported by the remote UE, that some relay UEs currently connected to the remote UE have poor signal quality or the remote UE consumes relatively high power when communicating with some relay UEs, the eNB may instruct the remote UE to release these relay UEs that have poor signal quality or consume relatively high power. For another example, if the eNB finds, from the at least one piece of measurement data reported by the remote UE, that the remote UE consumes relatively low power or has relatively good signal quality when communicating with some relay UEs, in this case, the eNB may instruct the remote UE to establish connections to these relay UEs that are corresponding to measurement data of relatively good signal quality or relatively low power consumption.

The foregoing describes application of the communication method in the embodiments of the present invention when the remote UE changes an uplink/downlink to a sidelink with reference to FIG. 4A and FIG. 4B and FIG. 5. The following describes application of the communication method in the embodiments of the present invention when the remote UE changes a sidelink to an uplink/downlink with reference to FIG. 6.

Figure 6:
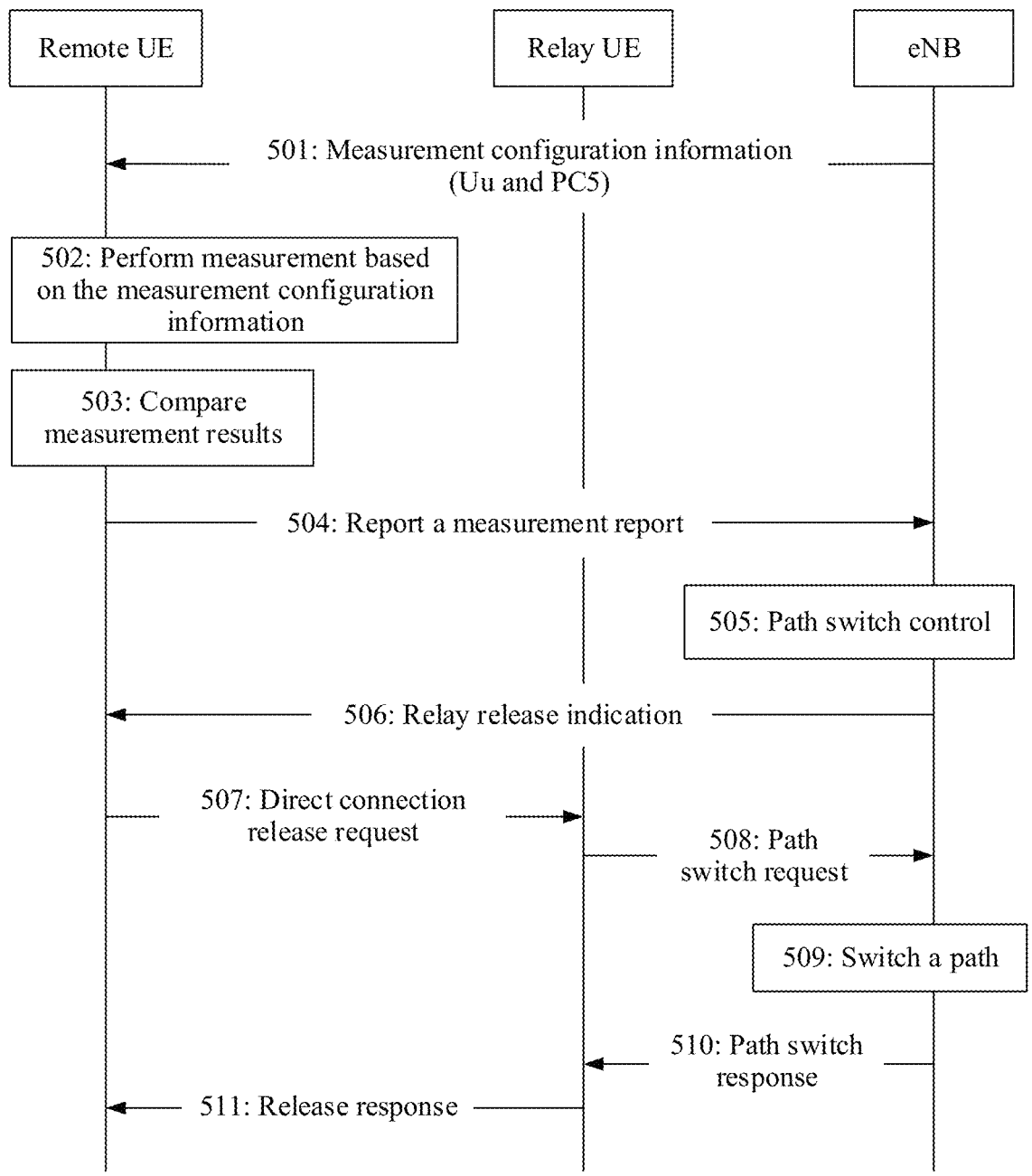
FIG. 6 is a schematic interaction diagram of a communication method according to still yet another embodiment of the present invention.

FIG. 6 is a schematic interaction diagram of a communication method according to still another embodiment of the present invention. As shown in FIG. 6, a main procedure includes operations 501 to 511.

It should be noted that, this embodiment is applicable to a case in which remote UE and relay UE are currently in a connected state and the remote UE changes a sidelink to an uplink/downlink.

501: An eNB sends measurement configuration information to the remote UE.

In one embodiment, the measurement configuration information includes a measurement object on a Uu interface, a measurement object on a PC5 interface, and the like. Specific content is the same as that described above.

It should be noted that, a reporting condition in this case is different from that in case 1 above. The reporting condition herein may be as at least one of the following: Signal quality of a currently used second communication link is lower than a fourth preset threshold; and a difference between the signal quality of the currently used second communication link and signal quality of a first communication link is less than a fifth preset threshold.

In other words, when the remote UE changes a D2D link to the first communication link, reporting by the remote UE is triggered if signal quality of the D2D link is relatively poor or if the signal quality of the first communication link measured by the remote UE is higher than that of the currently used second communication link.

In addition, herein, the remote UE may also perform reporting based on a period.

502: The remote UE performs measurement based on the measurement configuration information.

In operation 502, the remote UE separately measures signal quality of a Uu communication link and signal quality of a PC5 communication link.

503: The remote UE compares measurement results.

504: The remote UE reports a measurement report.

505: The eNB performs communication link change control.

506: The eNB sends relay release indication information to the remote UE.

In one embodiment, the eNB sends the relay release indication information to the remote UE when the eNB determines, based on measurement data in the measurement report, to change a communication link of the remote UE. The relay release indication information instructs the remote UE to release a connection to relay UE that currently communicates with the remote UE. The relay release indication information may carry information for configuring a data plane bearer between the remote UE and the eNB.

It should be noted that, some of the plurality of operations described in the foregoing embodiments may be used as optional operations and are not necessary operations in the technical solutions in the embodiments of the present invention, and therefore should not be construed as a limitation on the protection scope of the embodiments of the present invention.

In one embodiment, content indicated in the relay release indication information may be carried by using an RRC reconfiguration message in the prior art.

In this embodiment, the eNB performs new measurement configuration for the remote UE and triggers the remote UE to report measurement data. In this way, when the eNB determines that the signal quality of the Uu communication link is higher than the signal quality of the current PC5 communication link, the eNB controls the remote UE to instantly change to the Uu communication link, so that the remote UE can perform communication in real time by using a communication link with lower power consumption.

The foregoing describes the communication method in the embodiments of the present invention in detail with reference to FIG. 2 to FIG. 6. The following describes a network device and a terminal device in the embodiments of the present invention in detail with reference to FIG. 7 to FIG. 10.

Figure 7:
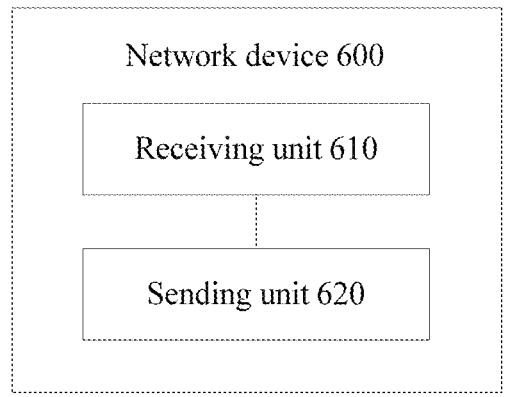
FIG. 7 is a schematic block diagram of a network device according to an embodiment of the present invention.

FIG. 7 is a schematic block diagram of a network device 600 according to an embodiment of the present invention. The network device is configured in a communications system including a first terminal device and at least one second terminal device. The network device communicates with the first terminal device by using a first communication link, the first terminal device communicates with the at least one second terminal device by using at least one second communication link, and the at least one second terminal device is in a one-to-one correspondence with the at least one second communication link. As shown in FIG. 7, the network device 600 includes:

a receiving unit 610, configured to receive a measurement report sent by the first terminal device, where the measurement report includes at least one piece of measurement data; and a sending unit 620, configured to send indication information of a communication link change policy to the first terminal device, where the indication information is used to instruct the first terminal device to perform change processing on a communication link based on the communication link change policy, and the communication link includes the first communication link and/or the second communication link.

The network device determines the communication link change policy based on the at least one piece of measurement data. The at least one piece of measurement data is in a one-to-one correspondence with at least one to-be-selected second terminal device, where the at least one to-be-selected second terminal device is some or all of the at least one second terminal device.

The units of the network device 600 in this embodiment of the present invention and the foregoing and other operations or functions are used to implement corresponding procedures executed by the network device in the method 100 or 200. For brevity, details are not described herein again.

In this embodiment of the present invention, when performing communication (for example, communication with the network device or D2D communication), the first terminal device may instantly measure signal quality of the second communication link (namely, D2D link) and signal quality of the first communication link, and report measured measurement data of the the at least one second communication link to the network device. The network device compares the measurement data of the second communication link with measurement data of the first communication link, to determine the communication link change policy of the first terminal device, and further control the first terminal device to use a communication link with lower power consumption for communication, thereby reducing power consumption of the first terminal device.

Figure 8:
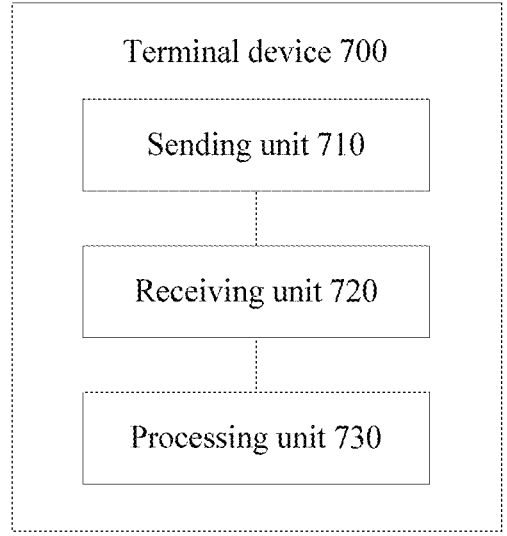
FIG. 8 is a schematic block diagram of a terminal device according to an embodiment of the present invention.

FIG. 8 is a schematic block diagram of a terminal device 700 according to an embodiment of the present invention. The terminal device is configured in a communications system including a network device and at least one second terminal device, where the network device communicates with the terminal device by using a first communication link, the terminal device communicates with the at least one second terminal device by using at least one second communication link, and the at least one second terminal device is in a one-to-one correspondence with the at least one second communication link. As shown in FIG. 8, the terminal device includes:

a sending unit 710, configured to send a measurement report to the network device, where the measurement report includes at least one piece of measurement data;

a receiving unit 720, configured to receive indication information that is sent by the network device and that is of a communication link change policy; and a processing unit 730, configured to perform change processing on a communication link based on the communication link change policy, where the communication link includes the first communication link and/or the second communication link.

The network device determines the communication link change policy based on the at least one piece of measurement data. The at least one piece of measurement data is in a one-to-one correspondence with at least one to-be-selected second terminal device, where the at least one to-be-selected second terminal device is some or all of the at least one second terminal device.

The units of the terminal device 700 in this embodiment of the present invention and the foregoing and other operations or functions are used to implement corresponding procedures executed by the first terminal device in the method 100 or 200. For brevity, details are not described herein again.

In this embodiment of the present invention, when performing communication (for example, direct communication with the network device or D2D communication), the first terminal device may instantly measure signal quality of the second communication link (namely, D2D link) and signal quality of the first communication link, and report measured measurement data of the the at least one second communication link to the network device. The network device compares the measurement data of the second communication link with measurement data of the first communication link, to determine the communication link change policy of the first terminal device, and further control the first terminal device to use a communication link with lower power consumption for communication, thereby reducing power consumption of the first terminal device.

The foregoing describes the communication method in the embodiments of the present invention in detail with reference to FIG. 2 to FIG. 6. The following describes a network device and a terminal device in the embodiments of the present invention in detail with reference to FIG. 9 to FIG. 10.

Figure 9:
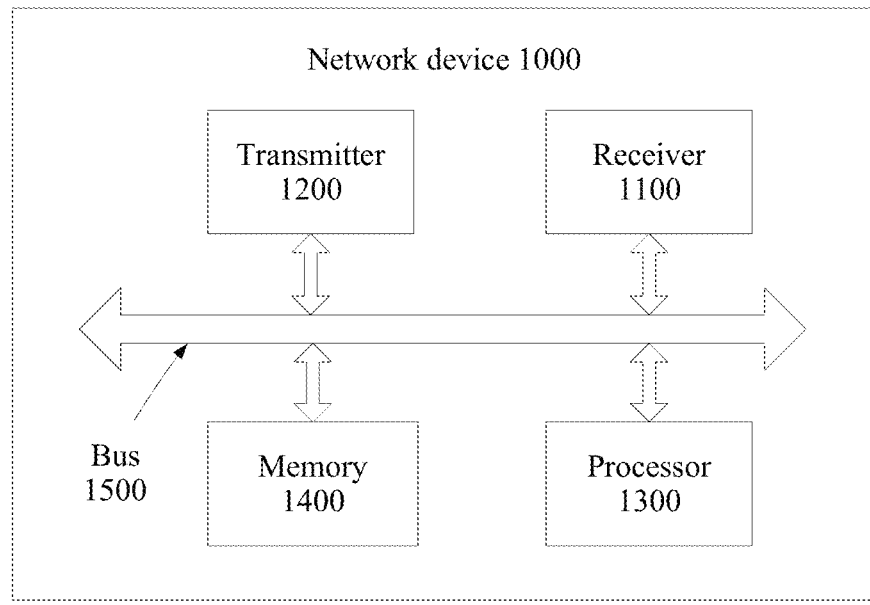
FIG. 9 is a schematic structural diagram of a network device according to an embodiment of the present invention.

FIG. 9 is a schematic structural diagram of a network device 1000 according to an embodiment of the present invention. The network device 1000 is configured in a communications system including a first terminal device and at least one second terminal device, where the network device communicates with the first terminal device by using a first communication link, the first terminal device communicates with the at least one second terminal device by using at least one second communication link, and the at least one second terminal device is in a one-to-one correspondence with the at least one second communication link. As shown in FIG. 9, the network device 1000 includes a receiver 1100, a transmitter 1200, a processor 1300, a memory 1400, and a bus system 1500. The receiver 1100, the transmitter 1200, the processor 1300, and the memory 1400 are connected to each other by using the bus system 1500. The memory 1400 is configured to store an instruction, and the processor 1300 is configured to execute the instruction stored by the memory 1400, to control the receiver 1100 to receive a signal and control the transmitter 1200 to send a signal, where the receiver 1100 is configured to receive a measurement report sent by the first terminal device, where the measurement report includes at least one piece of measurement data; and the transmitter 1200 is configured to send indication information of a communication link change policy to the first terminal device, where the indication information is used to instruct the first terminal device to perform change processing on a communication link based on the communication link change policy, and the communication link includes the first communication link and/or the second communication link.

The network device determines the communication link change policy based on the at least one piece of measurement data. The at least one piece of measurement data is in a one-to-one correspondence with at least one to-be-selected second terminal device, where the at least one to-be-selected second terminal device is some or all of the at least one second terminal device.

It should be understood that in this embodiment of the present invention, the processor 1300 may be a central processing unit (central processing unit, "CPU" for short), or the processor 1300 may be another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor or the like.

The memory 1400 may include a read-only memory and a random access memory, and provide an instruction and data to the processor 1300. A part of the memory 1400 may further include a non-volatile random access memory. For example, the memory 1400 may further store information about a device type.

The bus system 1500 may further include a power bus, a control bus, a status signal bus, and the like, in addition to a data bus. However, for clear description, various types of buses in the figure are marked as the bus system 1500.

In one embodiment, operations in the foregoing methods can be implemented by using a hardware integrated logical circuit in the processor 1300, or by using instructions in a form of software. The operations of the communication method disclosed with reference to the embodiments of the present invention may be directly performed by a hardware processor, or may be performed by using a combination of hardware in the processor and a software module. A software module may be located in a mature storage medium in the art, for example, a random access memory, a flash memory, a read-only memory, a programmable read-only memory, an electrically erasable programmable memory, or a register. The storage medium is located in the memory 1400, and the processor 1300 reads information in the memory 1400 and completes the operations in the foregoing methods in combination with hardware of the processor. To avoid repetition, details are not described herein again.

The units of the network device 1000 in this embodiment of the present invention and the foregoing and other operations or functions are used to implement corresponding procedures executed by the network device in the method 100 or 200. For brevity, details are not described herein again.

In this embodiment of the present invention, when performing communication (for example, direct communication with the network device or D2D communication), the first terminal device may instantly measure signal quality of the second communication link (namely, D2D link) and signal quality of the first communication link, and report measured measurement data of the the at least one second communication link to the network device. The network device compares the measurement data of the second communication link with measurement data of the first communication link, to determine the communication link change policy of the first terminal device, and further control the first terminal device to use a communication link with lower power consumption for communication, thereby reducing power consumption of the first terminal device.

Figure 10:
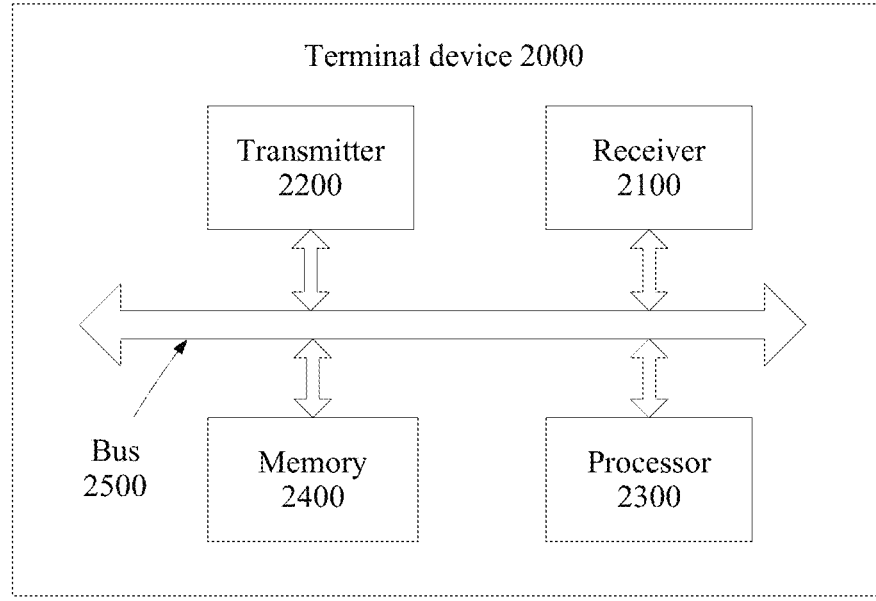
FIG. 10 is a schematic structural diagram of a terminal device according to an embodiment of the present invention.

FIG. 10 is a schematic structural diagram of a terminal device 2000 according to an embodiment of the present invention. The terminal device is configured in a communications system including a network device and at least one second terminal device, where the network device communicates with the terminal device by using a first communication link, the terminal device communicates with the at least one second terminal device by using at least one second communication link, and the at least one second terminal device is in a one-to-one correspondence with the at least one second communication link. As shown in FIG. 10, the terminal device 2000 includes a receiver 2100, a transmitter 2200, a processor 2300, a memory 2400, and a bus system 2500. The receiver 2100, the transmitter 2200, the processor 2300, and the memory 2400 are connected to each other by using the bus system 2500. The memory 2400 is configured to store an instruction, and the processor 2300 is configured to execute the instruction stored by the memory 2400, to control the receiver 2100 to receive a signal and control the transmitter 2200 to send a signal, where the transmitter 2200 is configured to send a measurement report to the network device, where the measurement report includes at least one piece of measurement data;

the receiver 2100 is configured to receive indication information that is sent by the network device and that is of a communication link change policy; and the processor 2300 is configured to perform change processing on a communication link based on the communication link change policy, where the communication link includes the first communication link and/or the second communication link.

The network device determines the communication link change policy based on the at least one piece of measurement data. The at least one piece of measurement data is in a one-to-one correspondence with at least one to-be-selected second terminal device, where the at least one to-be-selected second terminal device is some or all of the at least one second terminal device.

It should be understood that in this embodiment of the present invention, the processor 2300 may be a central processing unit ("CPU" for short), or the processor 2300 may be another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor or the like.

The memory 2400 may include a read-only memory and a random access memory, and provide an instruction and data for the processor 2300. A part of the memory 2400 may further include a non-volatile random access memory. For example, the memory 2400 may further store information about a device type.

The bus system 2500 may further include a power bus, a control bus, a status signal bus, and the like, in addition to a data bus. However, for clear description, various types of buses in the figure are marked as the bus system 2500.

In one embodiment, operations in the foregoing methods can be implemented by using a hardware integrated logical circuit in the processor 1300, or by using instructions in a form of software. The operations of the method disclosed with reference to the embodiments of the present invention may be directly performed by a hardware processor, or may be performed by using a combination of hardware in the processor and a software module. A software module may be located in a mature storage medium in the art, for example, a random access memory, a flash memory, a read-only memory, a programmable read-only memory, an electrically erasable programmable memory, or a register. The storage medium is located in the memory 2400, and the processor 2300 reads information in the memory 2400 and completes the operations in the foregoing methods in combination with hardware of the processor. To avoid repetition, details are not described herein again.

The units of the terminal device 2000 in this embodiment of the present invention and the foregoing and other operations or functions are used to implement corresponding procedures executed by the first terminal device in the method 100 or 200. For brevity, details are not described herein again.

In this embodiment of the present invention, when performing communication (for example, direct communication with the network device or D2D communication), the first terminal device may instantly measure signal quality of the second communication link (namely, D2D link) and signal quality of the first communication link, and report measured measurement data of the the at least one second communication link to the network device. The network device compares the measurement data of the second communication link with measurement data of the first communication link, to determine the communication link change policy of the first terminal device, and further control the first terminal device to use a communication link with lower power consumption for communication, thereby reducing power consumption of the first terminal device.

It should be understood that sequence numbers of the foregoing processes do not mean execution sequences in the embodiments of the present invention. The execution sequences of the processes should be determined based on functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the operations of the methods described in the embodiments of the present invention. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A communication method comprising:
configuring, by a network device, a normalized parameter for a first terminal device;
sending, by the network device, the normalized parameter to the first terminal device, so that the first terminal device determines at least one piece of measurement data by using the normalized parameter;
receiving, by the network device, a measurement report sent by the first terminal device, wherein the measurement report comprises the at least one piece of measurement data; and
sending, by the network device to the first terminal device, indication information of a communication link change policy determined based on the at least one piece of measurement data, wherein the indication information is used to instruct the first terminal device to perform change processing on a communication link based on the communication link change policy, and the communication link comprises at least one of a first communication link or a second communication link.

2. The method according to claim 1, wherein before the receiving, by the network device, a measurement report sent by the first terminal device, the method further comprising:

sending, by the network device, first measurement configuration information to the first terminal device, wherein the first measurement configuration information comprises a device-to-device (D2D) carrier frequency used by the second communication link, and the D2D carrier frequency comprises at least one of the following:

a carrier frequency for D2D communication based on a Long Term Evolution (LTE) system, a carrier frequency for D2D communication based on a wireless local area network (WLAN), or a carrier frequency for D2D communication based on Bluetooth.

3. The method according to claim 1, wherein before the receiving, by the network device, a measurement report sent by the first terminal device, the method further comprising:

sending, by the network device, second measurement configuration information to the first terminal device, wherein the second measurement configuration information comprises a reporting condition of the measurement report, and the reporting condition comprises at least one of the following:

the second communication link whose signal quality is higher than a first preset threshold exists;

the second communication link whose signal quality is higher than signal quality of the first communication link exists;

reporting is performed based on a period when the signal quality of the first communication link is lower than a second preset threshold;

reporting is performed based on a period when the second communication link exists, wherein a difference between signal quality of the second communication link and the signal quality of the first communication link is greater than a third preset threshold;

signal quality of a currently used second communication link is lower than a fourth preset threshold; or a difference between the signal quality of the currently used second communication link and the signal quality of the first communication link is less than a fifth preset threshold, wherein the signal quality comprises any one of reference signal received power (RSRP), reference signal received quality (RSRQ), a signal to interference plus noise ratio (SINK), or a signal-to-noise ratio (SNR).

4. The method according to claim 1, wherein the normalized parameter comprises at least one of transmit power of the network device, transmit power of at least one second terminal device configured by the network device, a first carrier frequency used by the first communication link, or the D2D carrier frequency.

5. The method according to claim 1, wherein the at least one piece of measurement data is in a one-to-one correspondence with at least one to-be-selected second terminal device, wherein the at least one to-be-selected second terminal device is some or all of at least one or more second terminal devices, a communication link currently used by the first terminal device is the first communication link, the measurement report further comprises at least one device identifier, and each device identifier is used to identify one to-be-selected second terminal device; and the sending, by the network device to the first terminal device, indication information of a communication link change policy determined based on the at least one piece of measurement data comprises:

determining, as a target second terminal device by the network device, a to-be-selected second terminal device corresponding to measurement data of best signal quality in the at least one piece of measurement data; and sending, by the network device, the indication information of the communication link change policy to the first terminal device, wherein the indication information carries a device identifier of the target second terminal device, and the communication link change policy instructs the first terminal device to connect to the target second terminal device.

6. The method according to claim 1, wherein the at least one piece of measurement data is in a one-to-one correspondence with at least one to-be-selected second terminal device, wherein the at least one to-be-selected second terminal device is some or all of at least one or more second terminal devices, a communication link currently used by the first terminal device is the first communication link, and each of the at least one piece of measurement data has one index; and the sending, by the network device to the first terminal device, indication information of a communication link change policy determined based on the at least one piece of measurement data comprises:

determining, as target measurement data by the network device, measurement data of best signal quality in the at least one piece of measurement data, and determining an index of the target measurement data; and sending, by the network device, the indication information of the communication link change policy to the first terminal device, wherein the indication information carries the index of the target measurement data, and the communication link change policy instructs the first terminal device to connect to a target second terminal device corresponding to the target measurement data.

7. The method according to claim 1, wherein a communication link currently used by the first terminal device is the second communication link, and the measurement report comprises measurement data of a currently used second communication link; and the sending, by the network device, indication information of a communication link change policy to the first terminal device comprises:

sending, by the network device, radio resource control information to the first terminal device, wherein the radio resource control information carries the indication information.

8. The method according to claim 7, wherein the sending, by the network device, indication information of a communication link change policy to the first terminal device comprises:

when the network device determines that signal quality of the currently used second communication link is lower than signal quality of the first communication link, sending, by the network device, connection release indication information to the first terminal device, wherein the connection release indication information is used to instruct the first terminal device to disconnect from the currently used second communication link and connect to the network device.

9. A communication method comprising:
- receiving, by a first terminal device, a normalized parameter sent by a network device;
- determining, by the first terminal device, at least one piece of measurement data by using the normalized parameter;
- sending, by the first terminal device, a measurement report to the network device, wherein the measurement report comprises the at least one piece of measurement data;
- receiving, by the first terminal device, indication information that is sent by the network device and that is of a communication link change policy determined by the network device based on the at least one piece of measurement data; and
- performing, by the first terminal device, change processing on a communication link based on the communication link change policy, wherein the communication link comprises at least one of a first communication link or a second communication link.

10. The method according to claim 9, before the sending, by the first terminal device, a measurement report to the network device, the method further comprising:
- receiving, by the first terminal device, first measurement configuration information sent by the network device, wherein the first measurement configuration information comprises a device-to-device (D2D) carrier frequency used by the second communication link, and the D2D carrier frequency comprises at least one of the following:
- a carrier frequency for D2D communication based on a Long Term Evolution (LTE) system, a carrier frequency for D2D communication based on a wireless local area network (WLAN), or a carrier frequency for D2D communication based on Bluetooth.

11. The method according to claim 9, wherein before the sending, by the first terminal device, a measurement report to the network device, the method further comprising:
- receiving, by the first terminal device, second measurement configuration information sent by the network device, wherein the second measurement configuration information comprises a reporting condition of the measurement report, and the reporting condition comprises at least one of the following:
- the second communication link whose signal quality is higher than a first preset threshold exists;
- the second communication link whose signal quality is higher than signal quality of the first communication link exists;
- reporting is performed based on a period when the signal quality of the first communication link is lower than a second preset threshold;
- reporting is performed based on a period when the second communication link exists, wherein a difference between signal quality of the second communication link and the signal quality of the first communication link is greater than a third preset threshold;
- signal quality of a currently used second communication link is lower than a fourth preset threshold; or
- a difference between the signal quality of the currently used second communication link and the signal quality of the first communication link is less than a fifth preset threshold, wherein
- the signal quality comprises any one of reference signal received power (RSRP), reference signal received quality (RSRQ), a signal to interference plus noise ratio (SINK), or a signal-to-noise ratio (SNR).

12. The method according to claim 9, wherein the normalized parameter comprises at least one of transmit power of the network device, transmit power of at least one second terminal device, a first carrier frequency used by the first communication link, or the D2D carrier frequency.

13. The method according to claim 9, wherein the at least one piece of measurement data is in a one-to-one correspondence with at least one to-be-selected second terminal device, wherein the at least one to-be-selected second terminal device is some or all of at least one or more second terminal devices, a communication link currently used by the first terminal device is the first communication link, the measurement report further comprises at least one device identifier, and each device identifier is used to identify one to-be-selected second terminal device; and
- the indication information carries a device identifier of a target second terminal device, wherein the target second terminal device is a second terminal device corresponding to measurement data that is determined by the network device and that is of best signal quality in the at least one piece of measurement data; and
- the performing, by the first terminal device, change processing on a communication link based on the communication link change policy comprises:
- determining, by the first terminal device, the target second terminal device from the at least one to-be-selected second terminal device based on the device identifier of the target second terminal device, and connecting to the target second terminal device.

14. The method according to claim 9, wherein the at least one piece of measurement data is in a one-to-one correspondence with at least one to-be-selected second terminal device, wherein the at least one to-be-selected second terminal device is some or all of at least one or more second terminal devices, and a communication link currently used by the first terminal device is the first communication link; and
- the indication information carries an index of target measurement data, and the target measurement data is measurement data that is determined by the network device and that is of best signal quality in the at least one piece of measurement data; and
- the performing, by the first terminal device, change processing on a communication link based on the communication link change policy comprises:
- determining, by the first terminal device, the target measurement data from the at least one piece of measurement data based on the index, and connecting to a target second terminal device corresponding to the target measurement data.

15. The method according to claim 9, wherein a communication link currently used by the first terminal device is the second communication link, and the measurement report comprises measurement data of the currently used second communication link; and
- the receiving, by the first terminal device, indication information that is sent by the network device and that is of a communication link change policy comprises:
- receiving, by the first terminal device, radio resource control information sent by the network device, wherein the radio resource control information carries the indication information.

16. The method according to claim 15, wherein the receiving, by the first terminal device, indication information that is sent by the network device and that is of a communication link change policy comprises:
- receiving, by the first terminal device, connection release indication information sent by the network device, wherein the connection release indication information is sent to the first terminal device when the network device determines that signal quality of the currently used second communication link is lower than signal quality of the first communication link; and
- disconnecting, by the first terminal device, a connection of the currently used second communication link according to the connection release indication information, and connecting to the network device.

17. A terminal device comprising:
- a receiver configured to receive a normalized parameter sent by a network device;
- a processor configured to determine at least one piece of measurement data by using the normalized parameter;
- a transmitter configured to send a measurement report to a network device, wherein the measurement report comprises at least one piece of measurement data;
- the receiver configured to receive indication information that is sent by the network device and that is of a communication link change policy determined by the network device based on the at least one piece of measurement data; and
- the processor configured to perform change processing on a communication link based on the communication link change policy, wherein the communication link comprises at least one of a first communication link or a second communication link.

18. The terminal device according to claim 17, wherein before the transmitter sends the measurement report to the network device,
- the receiver is further configured to receive first measurement configuration information sent by the network device, wherein the first measurement configuration information comprises a device-to-device D2D carrier frequency used by the second communication link, and the D2D carrier frequency comprises at least one of the following:
- a carrier frequency for D2D communication based on a Long Term Evolution LTE system, a carrier frequency for D2D communication based on a wireless local area network WLAN, or a carrier frequency for D2D communication based on Bluetooth.

* * * * *

UNITED STATES PATENT AND TRADEMARK OFFICE
CERTIFICATE OF CORRECTION

PATENT NO. : 10,979,960 B2
APPLICATION NO. : 16/245029
DATED : April 13, 2021
INVENTOR(S) : Hong Wang and Wei Quan Page 1 of 1

It is certified that error appears in the above-identified patent and that said Letters Patent is hereby corrected as shown below:

In the Claims

In Claim 3, Column 31, Line 50, delete "(SINK)" and insert --(SINR)--.

In Claim 11, Column 33, Line 67, delete "(SINK)" and insert --(SINR)--.

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*